United States Patent [19]

Bliss

[11] Patent Number: 4,487,321
[45] Date of Patent: Dec. 11, 1984

[54] ARTICLE CODING AND SEPARATING SYSTEM

[75] Inventor: George N. Bliss, Franklin, Mich.

[73] Assignee: Diamond Automations, Inc., Farmington Hills, Mich.

[21] Appl. No.: 394,444

[22] Filed: Jul. 1, 1982

[51] Int. Cl.$^3$ .......................... A01K 43/04; B07C 9/00
[52] U.S. Cl. ................................... 209/510; 209/705; 209/938; 356/52
[58] Field of Search ............... 209/509, 510, 702, 705, 209/936, 938, 940, 942; 356/52

[56] References Cited

U.S. PATENT DOCUMENTS

| | | | |
|---|---|---|---|
| 1,682,598 | 8/1928 | Cook | 356/52 |
| 2,311,276 | 2/1943 | Wilcox | 209/942 X |
| 3,106,707 | 10/1963 | Thompson | |
| 3,187,892 | 6/1965 | Whitmore et al. | |
| 3,342,935 | 9/1967 | Leifer et al. | |
| 3,461,454 | 8/1969 | Steckenrider | |
| 3,462,548 | 8/1969 | Rinder | |
| 3,466,646 | 9/1969 | Lewin | |
| 3,469,242 | 9/1969 | Eachus et al. | |
| 3,503,501 | 3/1970 | Seaborn | 209/510 |
| 3,535,447 | 10/1970 | Wollrich | |
| 3,581,888 | 6/1971 | Kelly et al. | |
| 3,598,903 | 8/1971 | Johnson et al. | |
| 3,705,956 | 12/1972 | Dertouzos | |
| 3,801,733 | 4/1974 | Bailey | |
| 3,819,857 | 6/1974 | Inokuchi | |
| 4,029,899 | 6/1977 | Gordon | |
| 4,051,952 | 10/1977 | Hauptmann et al. | |
| 4,164,291 | 8/1979 | Carlow | 209/942 X |
| 4,184,598 | 1/1980 | Cowlin et al. | 209/705 |

FOREIGN PATENT DOCUMENTS

| | | | |
|---|---|---|---|
| 623963 | 7/1927 | France | 356/52 |
| 542678 | 1/1942 | United Kingdom | |

Primary Examiner—Robert B. Reeves
Assistant Examiner—Edward M. Wacyra
Attorney, Agent, or Firm—Kenyon & Kenyon

[57] ABSTRACT

An article coding and separating system such as for instance, in which articles or defective eggs which are randomly dispersed in a plurality of similar articles are coded and their location identified. An elongated pivotally mounted pointer is disposed so as to be pivotable over an inspection area in mutually orthogonal directions, parallel and transverse to the longitudinal axis of a conveyor, and axially movable towards and away from the articles being conveyed. The pointer generates signals for simultaneously indicating the position of articles on the conveyor within the inspection area, and the type of article being identified.

36 Claims, 38 Drawing Figures

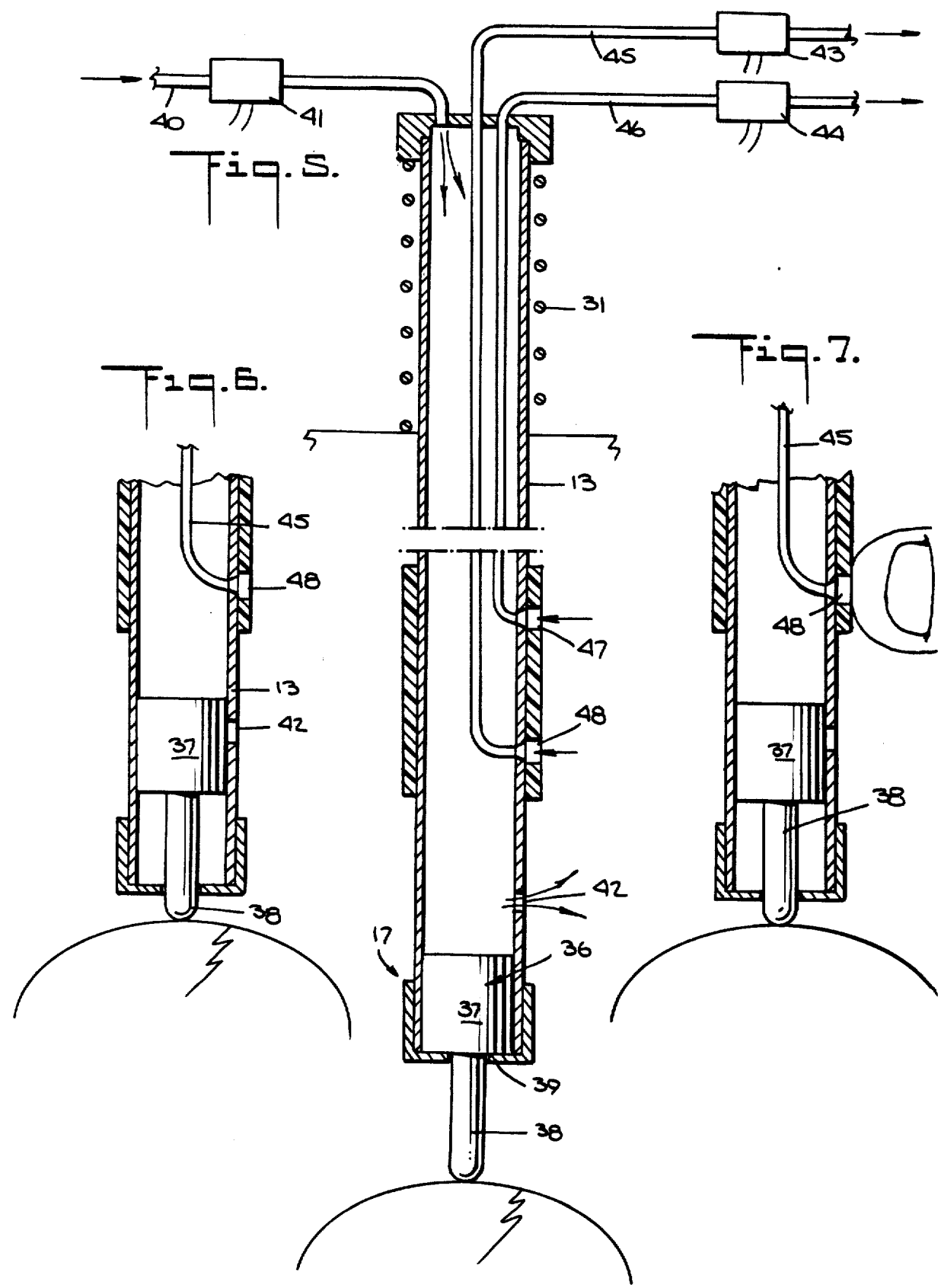

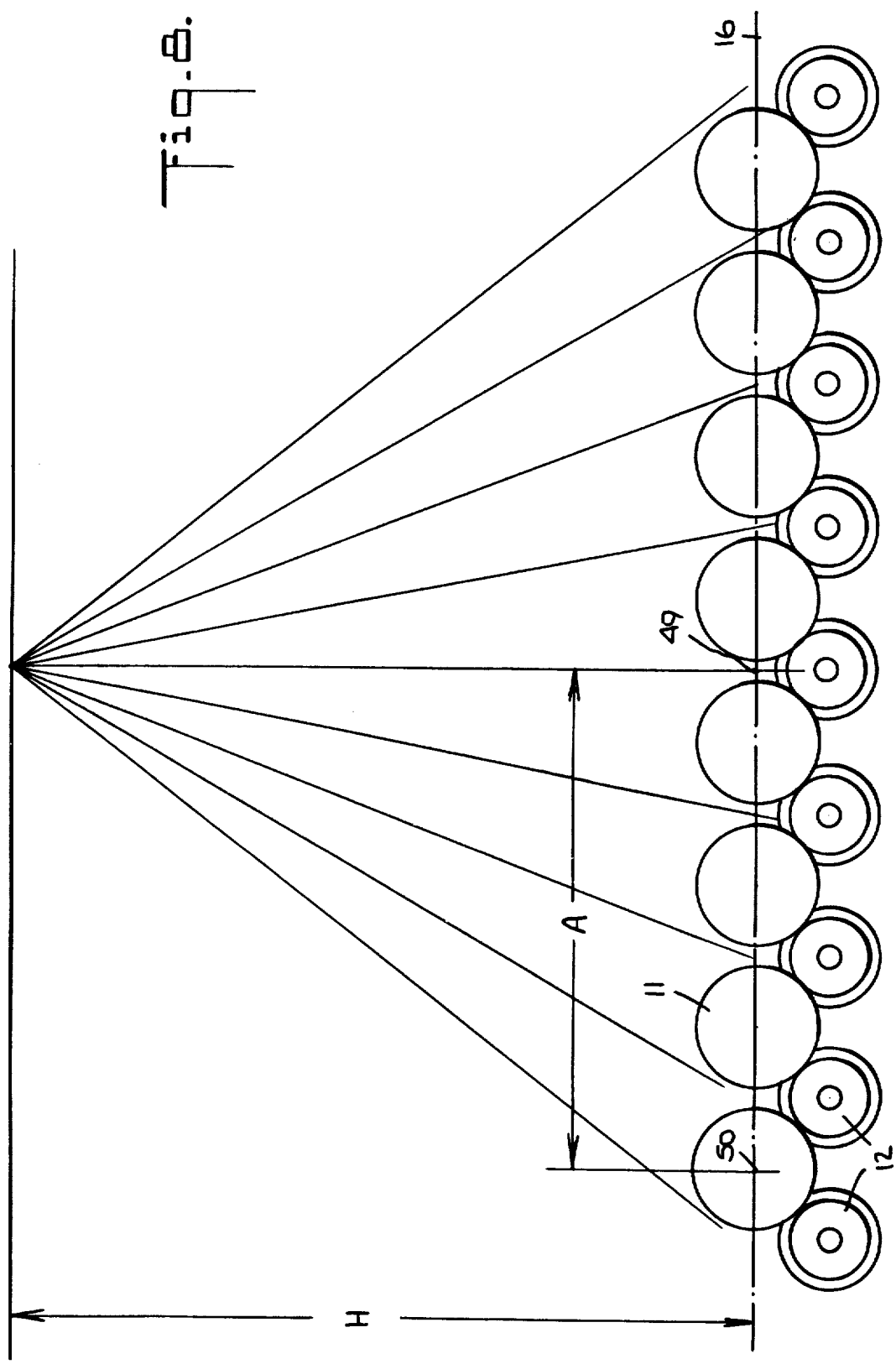

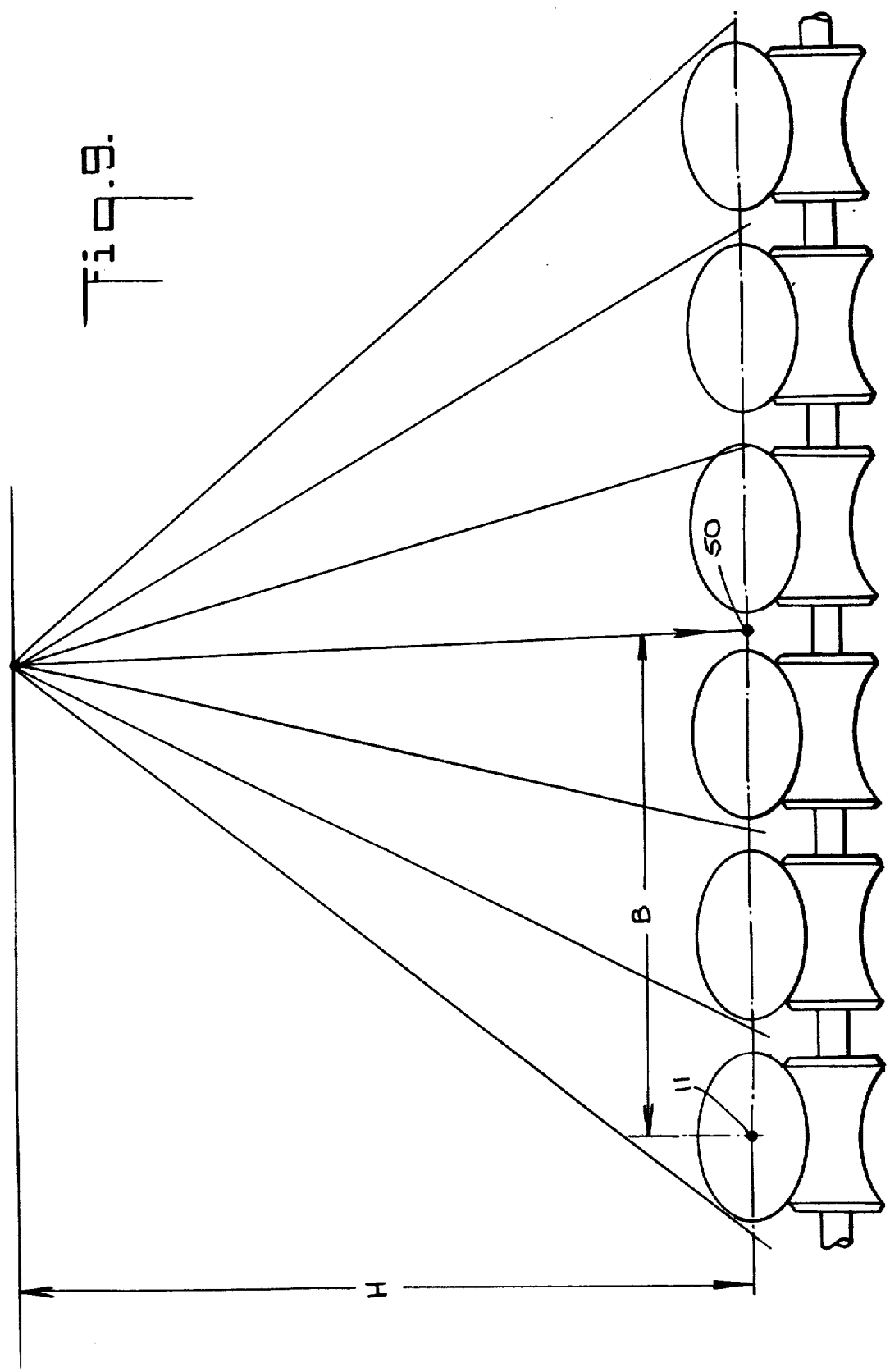

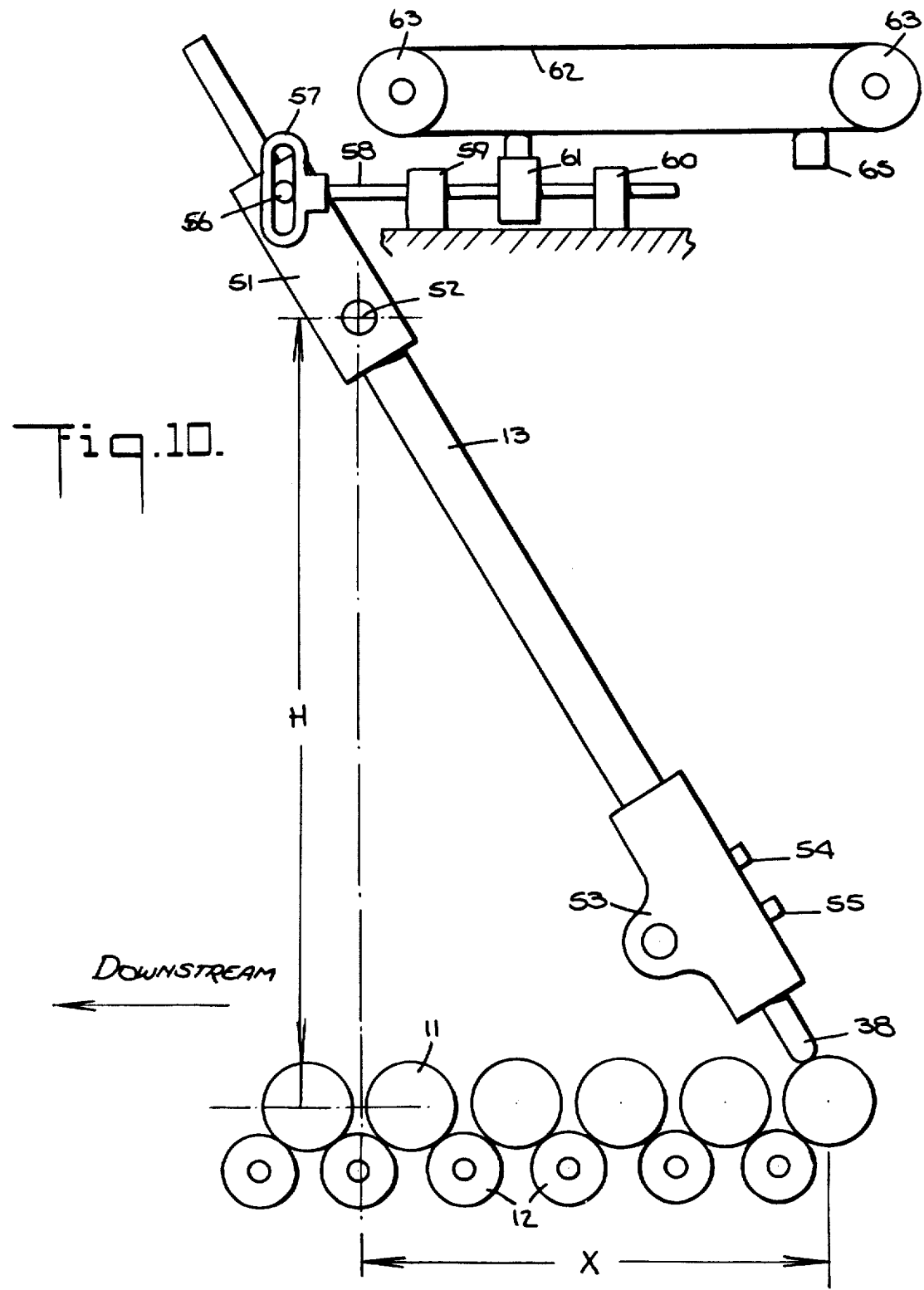

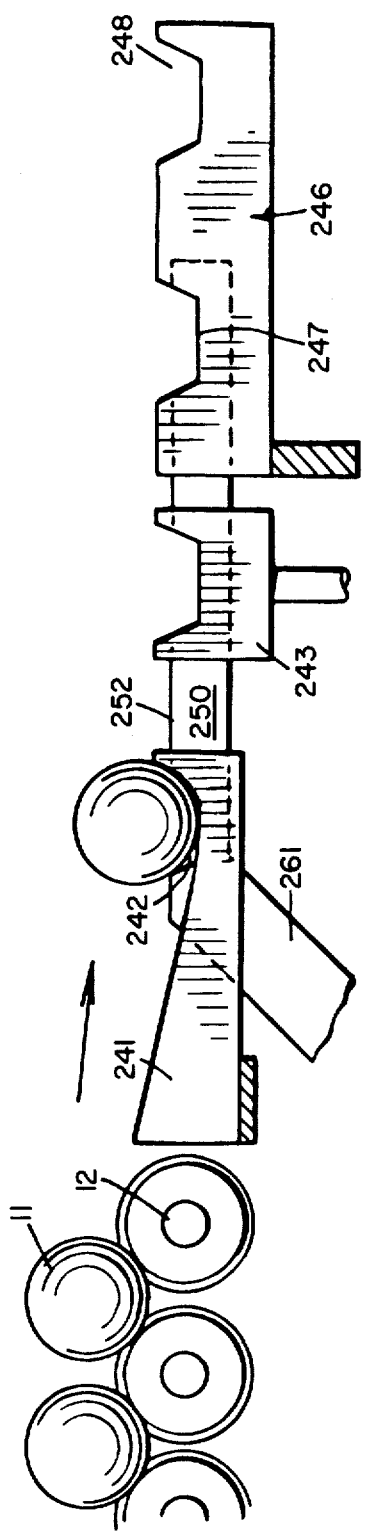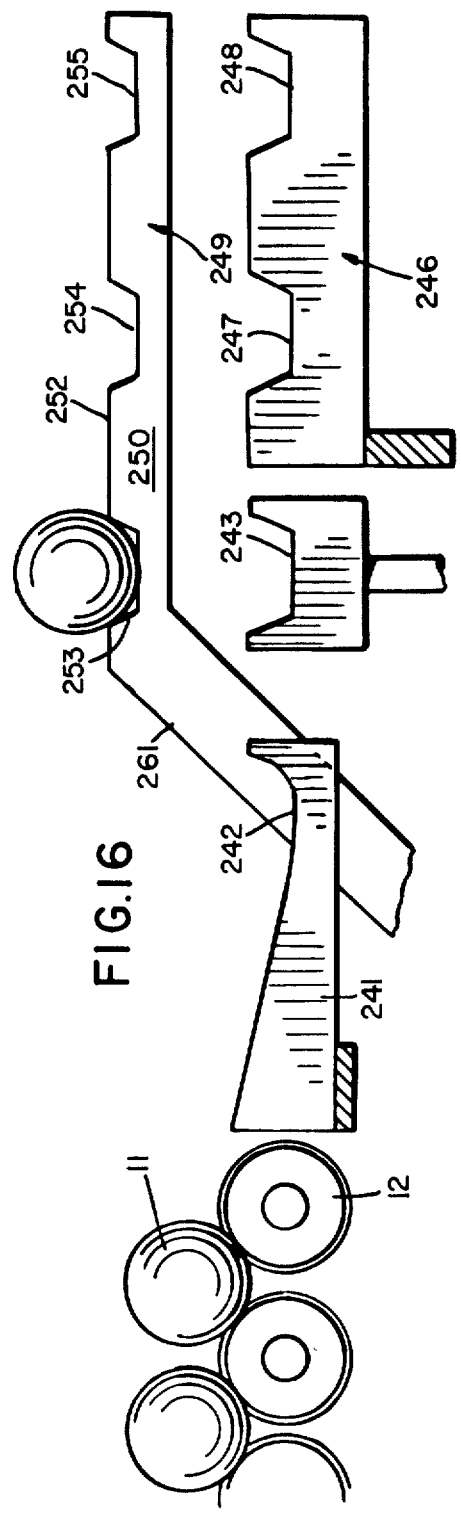

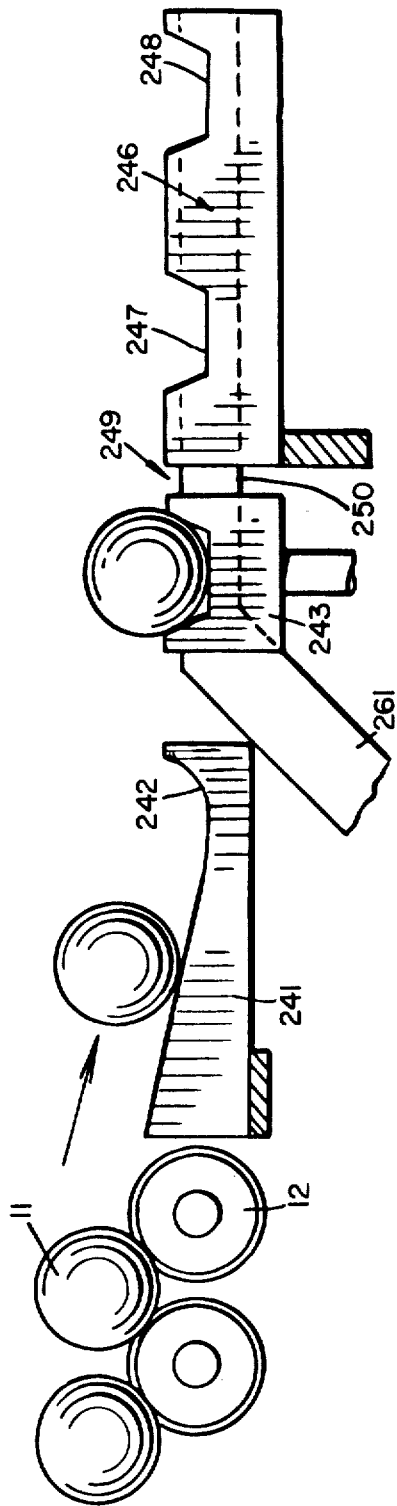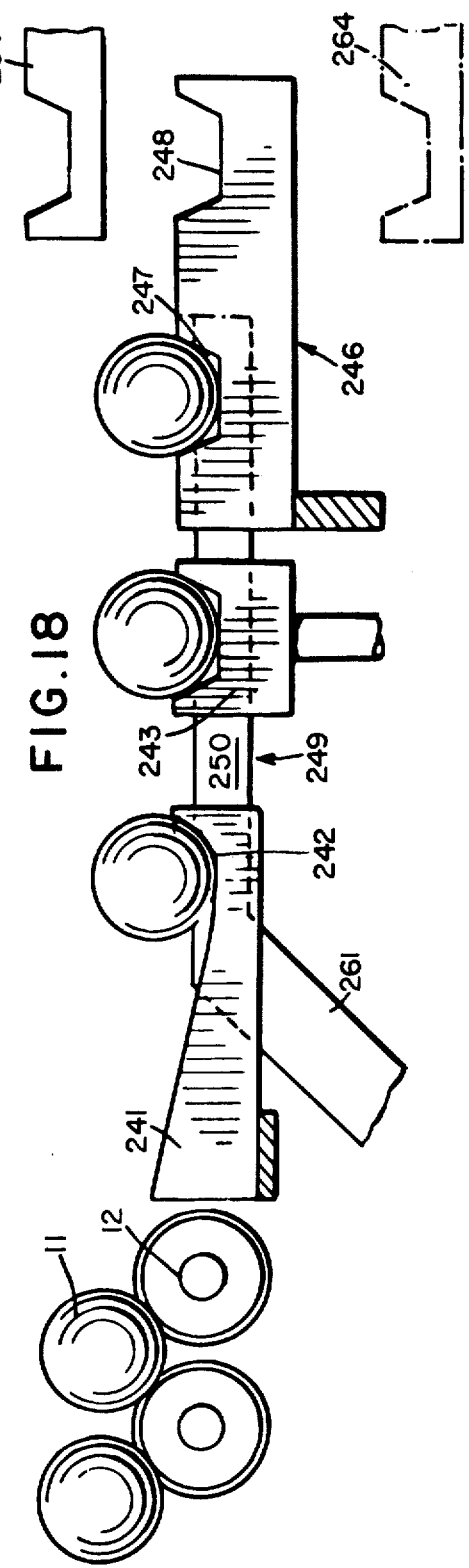

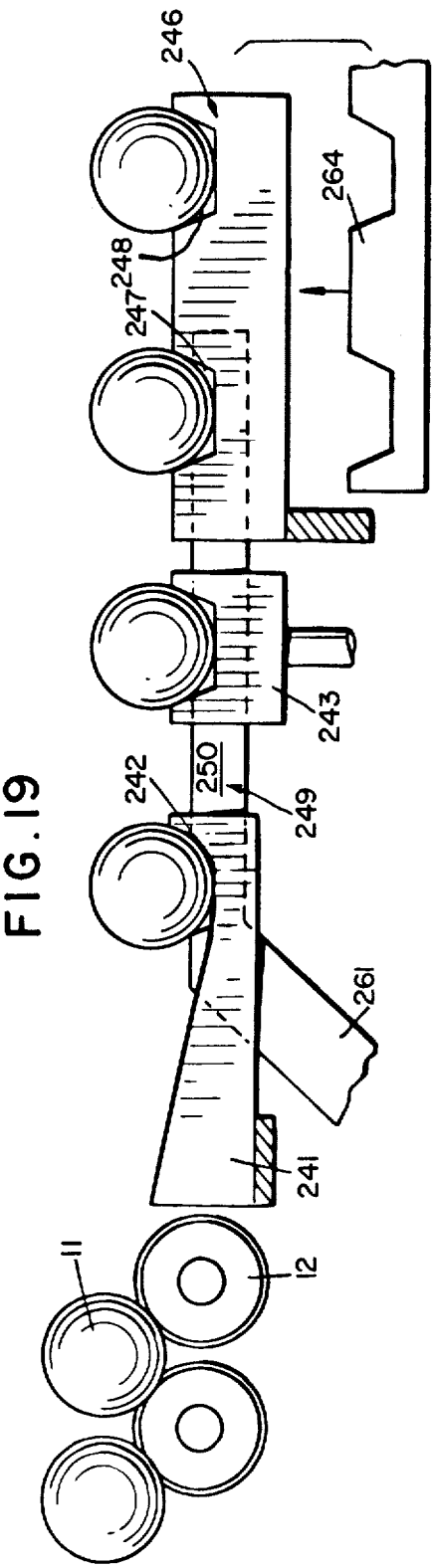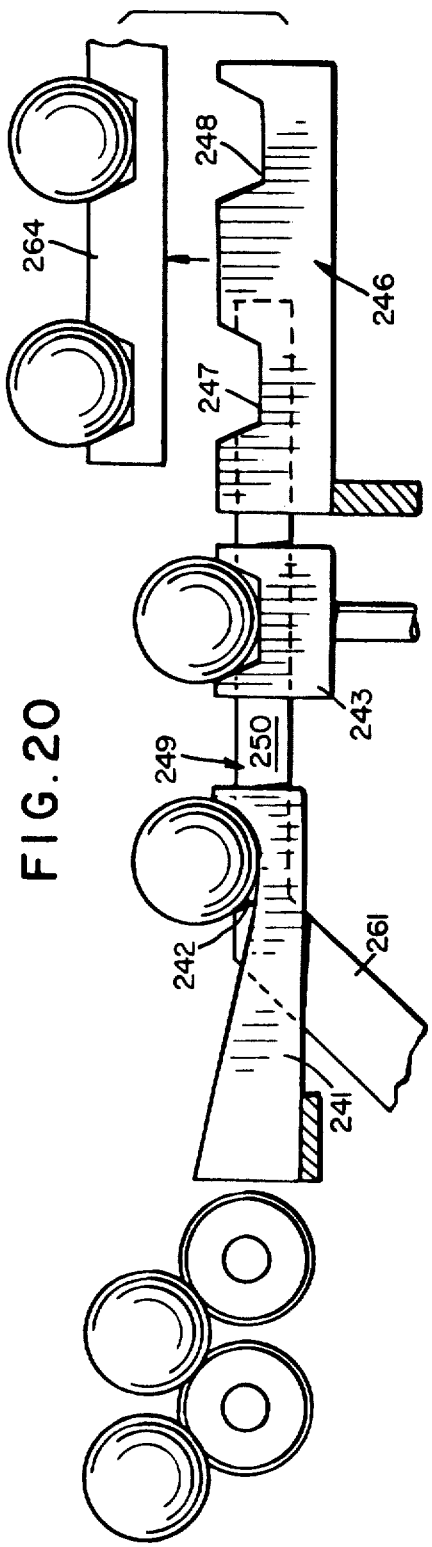

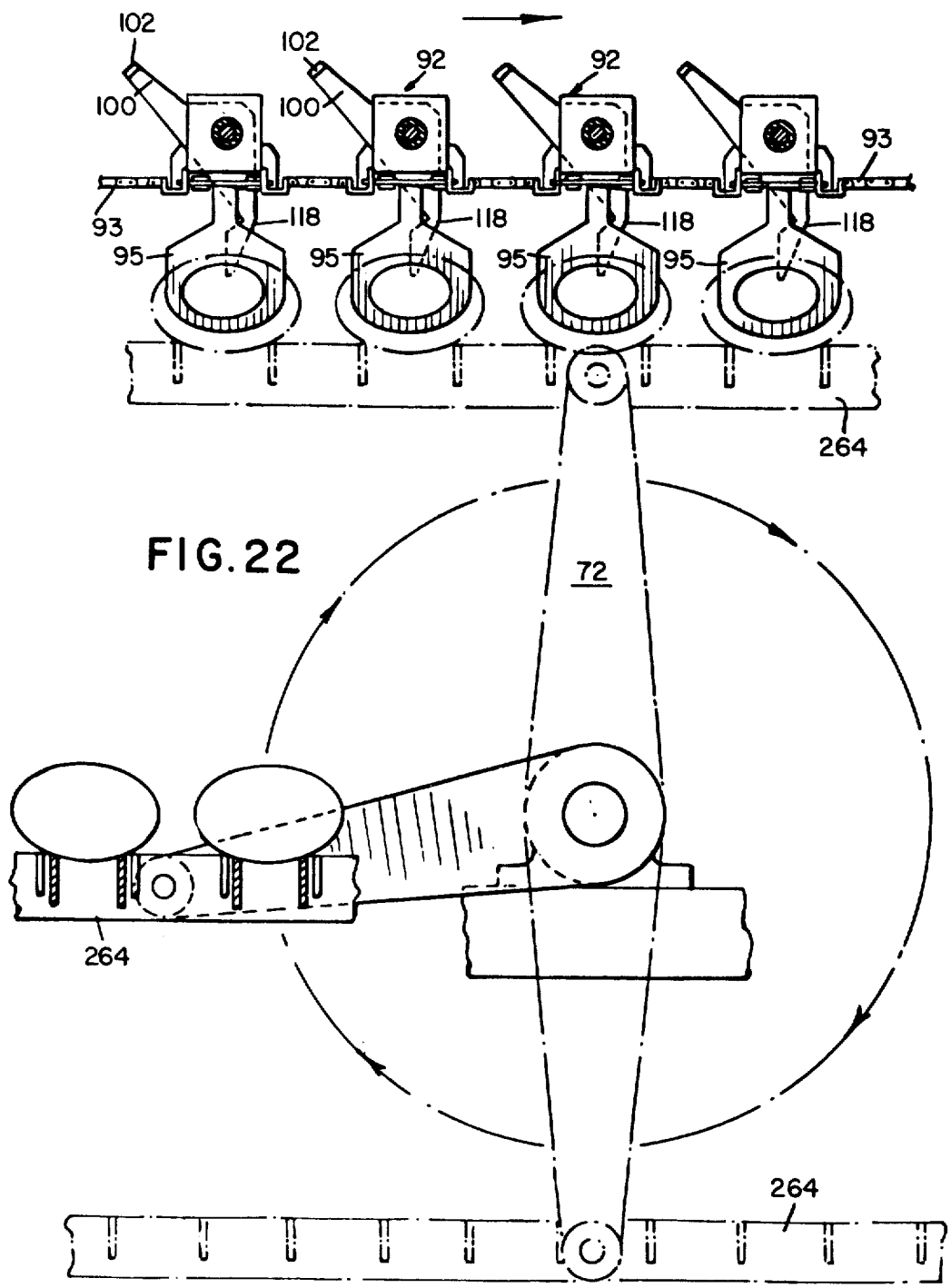

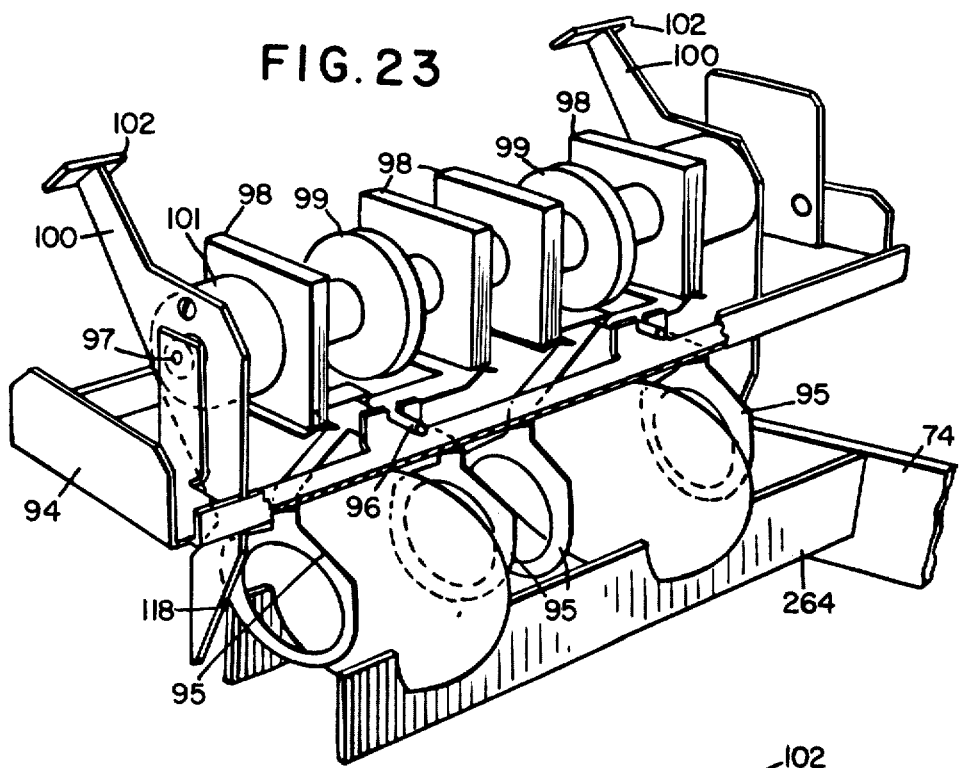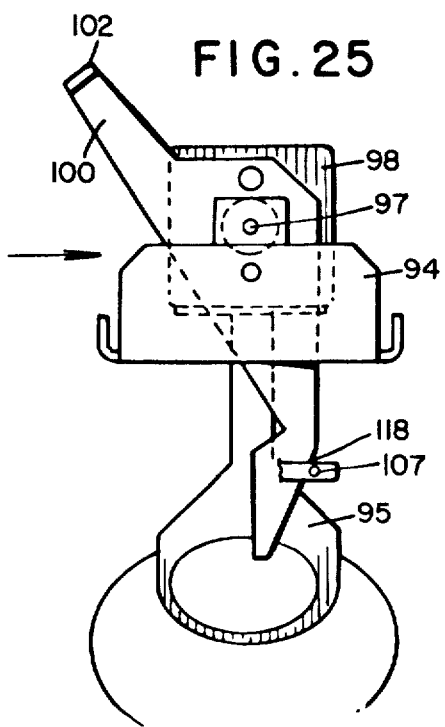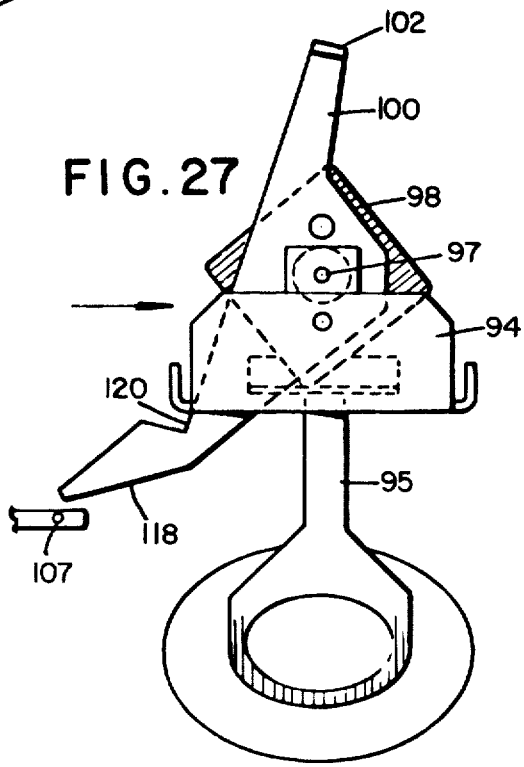

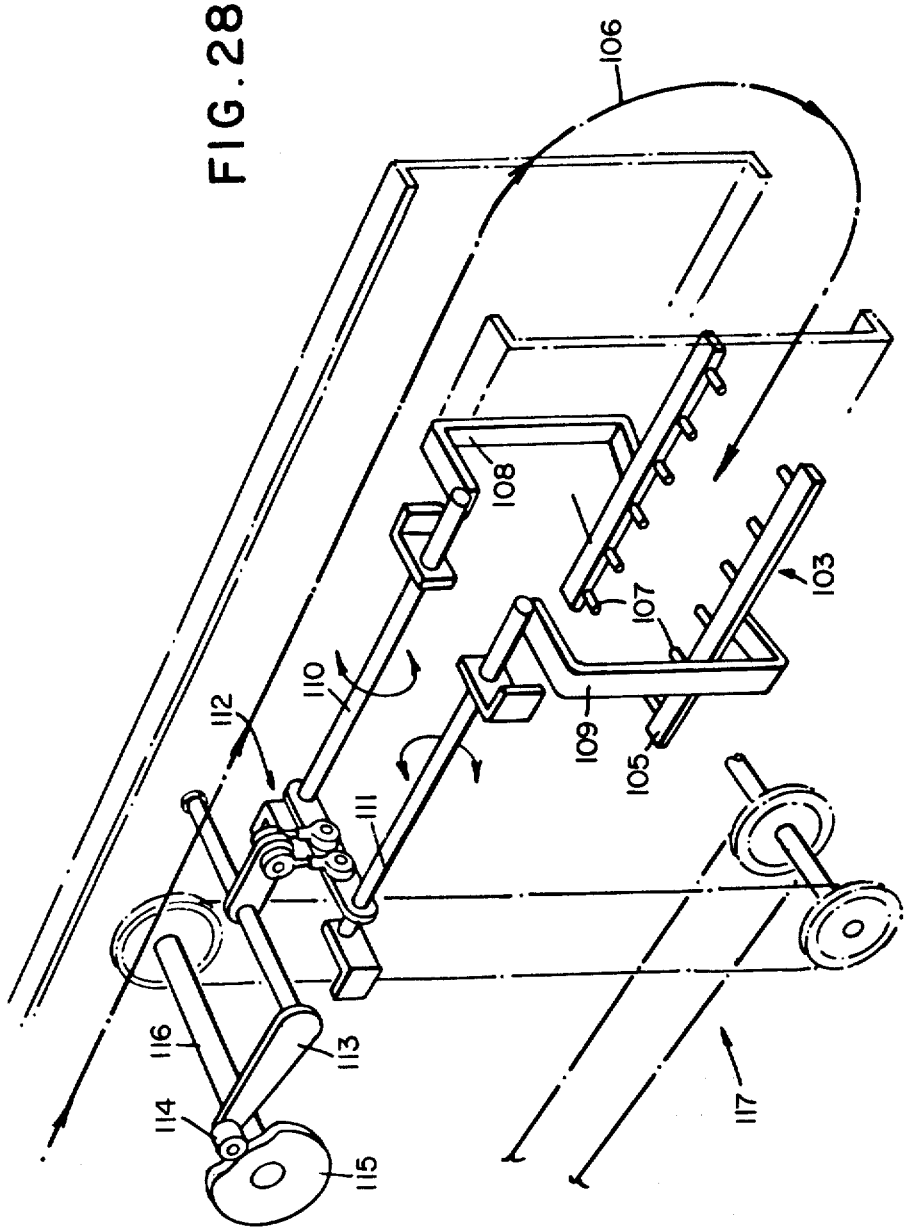

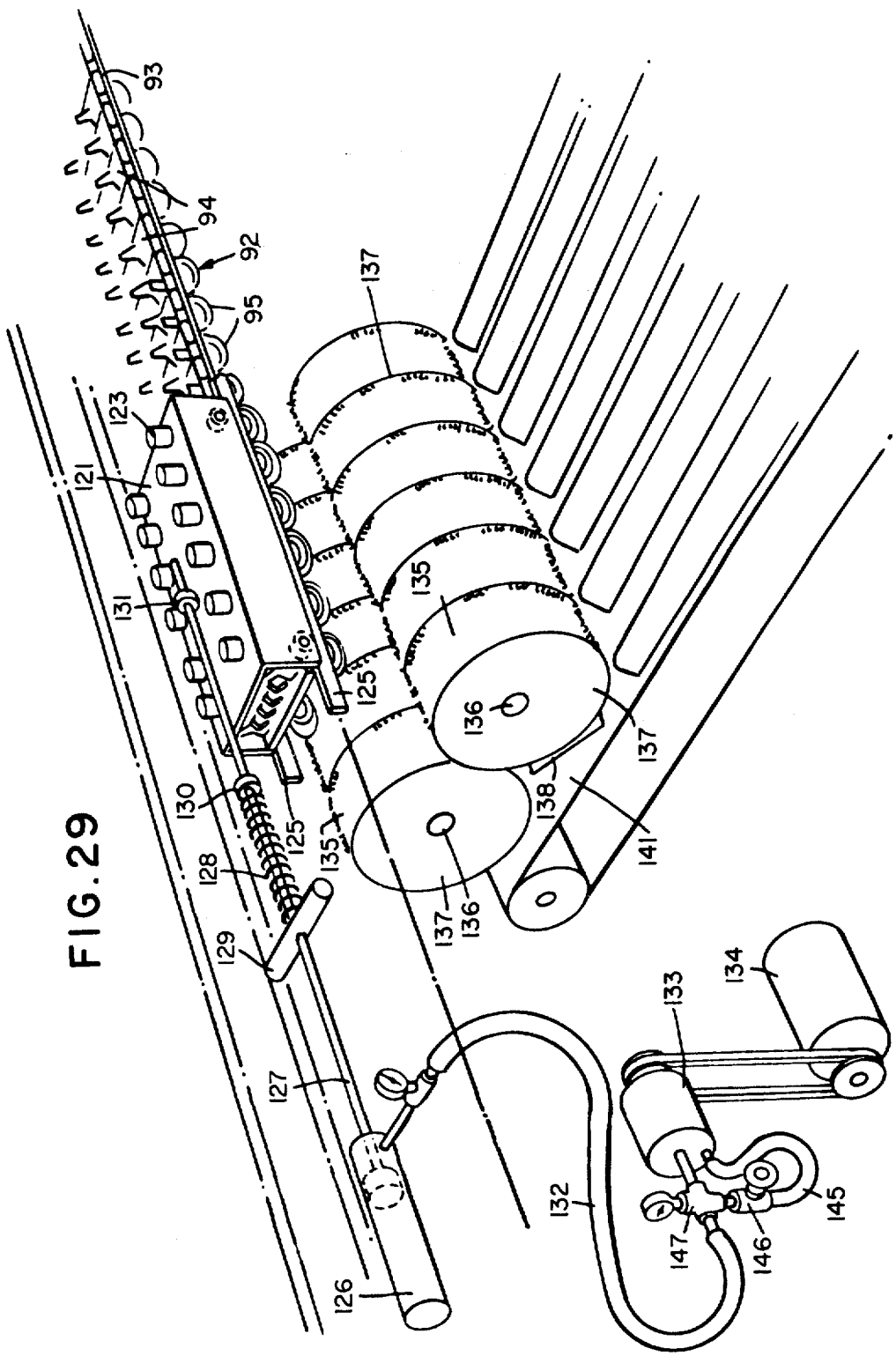

ARTICLE CODING AND SEPARATING SYSTEM

BACKGROUND OF THE INVENTION

1. Field of the Invention

This invention relates generally to an article coding and separating system, and in particular to one adapted for egg candling. The system is disclosed herein in the form of an improved egg candler which is suitable for identifying defects such as blood spots, dirt stains, rough spots and shell cracks during an egg grading process and may also be utilized in coding other articles on a moving conveyor for diversion at a point downstream.

2. Description of the Prior Art

Systems for sorting articles and separating defective articles from the mass of articles being conveyed are known. One such system is disclosed in U.S. Pat. No. 4,164,291 for a "Sorting Apparatus" and is designed to separate undesirable materials such as stones from potatoes being harvested. The patented apparatus provides a matrix or sets of orthogonal coils for receiving electrical signals transmitted by a selector member. The orthogonal coils are arranged to define an array of sites, the coils being thus disposd in a matrix beneath the conveyor which carries the potatoes being processed. A selector member or wand is provided for hand operation by an operator whose function is to conduct a visual inspection of the material on the conveyor. The selector member is in the form of a rod-like member adapted to be hand-held by the operator and includes a piezoelectric transducer which emits bursts of a radio frequency electro-magnetic signal. The selector member or wand is activated upon contact with the object selected by the operator as an object to be rejected.

The system disclosed in U.S. Pat. No. 4,164,291 includes a multiplicity of parts, particularly in forming the matrix of coils employed therein. Moreover, this system is designed to identify only the location of articles and does not have the capability of also identifying the particular physical characteristics of the article which is considered to be undesirable or a defect.

In addition, while the patent indicates it is adapted for use with egg candlers, in such a system, the coils forming the grid therein would most probably interfere at least to some degree with the lighting necessary in the candling area. Egg candlers, generally speaking, consist of a movable conveyor including a plurality of spool bars disposed in aligned, spaced-apart relationship which conveys eggs over a high-intensity light source to enable the visual detection of a variety of possible defects such as blood spots, dirt stains, rough spots, shell cracks and the like. Such egg candlers may be used either alone or in combination with an egg grader for classifying and separating eggs according to their individual physical characteristics, including weight.

In such egg candlers, there are limitations on the operational speed of the machine, which in turn limit the maximum operating speed for an entire automated egg processing system. In order to improve the operating efficiency of such egg processing systems, the speed at which defective eggs are detected and defects are identified by the candler must be increased. This requires a candler which has a high-speed response time but which also enables accurate identification and separation of defective eggs. The detection of eggs having defects is of utmost importance since oversights would result in the packaging of eggs which do not conform to government specifications. Thus, the candling function must be carried out at a speed which is low enough to enable accurate and complete visual detection of defects as the eggs are conveyed through the candler, yet at a speed which is rapid enough so as not to limit the maximum operational speed of the processing system with which the candler is used. Inevitably, this places increased performance demands on the egg candler.

SUMMARY OF THE INVENTION

It is therefore an object of the present invention to provide an improved article coding and separating system capable of accurately and conveniently coding articles on a moving conveyor for diversion at a point downstream and which is highly efficient and capable of operating at a high rate of speed in order to effectively facilitate the separation of the articles being processed.

It is another object of the present invention to provide an improved article and separating system which permits the inspection of articles conveyed through the system and the coding of the presence of selective articles over a wide area of a moving conveyor.

It is also an object of the present invention to provide an improved egg candler which overcomes the aforementioned disadvantages of heretofore known candlers and which may be used in conjunction with an egg grading apparatus and enables both accurate and convenient identification of the position and one or more physical characteristics of defective eggs which are randomly dispersed in a plurality of eggs continuously conveyed through the candler so as to permit separation of eggs with the same type of defect at the same location in the egg grading apparatus for packaging.

It is still a further object of the present invention to provide an improved egg candler which enables the random identification of the position and one or more physical characteristics of defective eggs in any location on the egg candler conveyor in any sequence.

These and other objects of the invention are achieved in an article coding and separating system for operator coding of selected articles being conveyed past an inspection area along with a larger quantity of articles, which comprises conveying means for carrying a plurality of articles through the inspection area, support means disposed above the inspection area, and an elongated pointer means having its upper end pivotally mounted to the support means for pivotable movement in at least two directions over the conveying means within a selected area of the inspection area. One of the directions in which the pointer is movable is approximately parallel to the longitudinal axis of the conveying means and the other of the directions is perpendicular thereto. The pointer means has the vertical lower end thereof disposed adjacent the conveying means and is further adapted for axial movement along the longitudinal axis thereof so that the vertical lower end of the pointer means is movable into and out of engagement with selected articles passing within the selected area of the inspection area. The pointer means further includes means coupled thereto responsive to the pivotal movement thereof for generating at least a first signal for identifying the position of selected articles on the conveying means when the articles are engaged by the pointer means and means for separating the selected articles from the remaining articles in accordance with the coding thereof.

The foregoing objects of the invention are also achieved in a method of coding and separating selected articles being conveyed past an inspection area along with a larger quantity of articles, which comprises the steps of conveying the quantity of articles in spaced-apart relationship on a conveyor means through the inspection area, selecting the article to be coded while being conveyed through the inspection area, and pivotally swinging a pointer means toward the location of the article to be coded and generating at least one first signal responsive to the angular position of the pointer means with respect to the conveying means. The article to be coded is then contacted with the pivotally swinging pointer means, thereby identifying the location of the article to be coded, and the coded articles are separated from the remaining articles.

These and other novel features and advantages of the invention will be described in greater detail in the following detailed description.

BRIEF DESCRIPTION OF THE DRAWINGS

FIG. 5 is a longitudinal, cross-sectional view of the rod illustrated in FIG. 2.

FIG. 6 is a partial longitudinal, cross-sectional view of the vertically lower end of the rod shown in FIG. 2.

FIG. 7 is another partial longitudinal, cross-sectional view of the vertically lower end of the rod shown in FIG. 2.

FIG. 8 is a schematic illustration of various longitudinal positions into which the rod is movable over the spool bars during operation of the candling system.

FIG. 9 is a schematic illustration of various transverse positions into which the rod is movable over the spool bars during operation of the candling system.

FIG. 10 is a side view of another embodiment of a movable rod for use with the improved egg candler of the present invention.

FIG. 15 is an enlarged, elevational view, partially in cross-section, of the egg weighing station depicting an egg being fed from the candler onto a first holding station.

FIG. 16 is an enlarged, elevational view, similar to that of FIG. 15, illustrating an egg being advanced onto the egg weighing station.

FIG. 17 is an enlarged, elevational view, similar to that of FIG. 15, illustrating an egg being deposited on the weighing station and another egg being fed from the candler to the first holding station.

FIG. 18 is an enlarged, elevational view, similar to that of FIG. 15, illustrating an egg being advanced from the weighing station to a second holding station.

FIG. 19 is an enlarged, elevational view, similar to that of FIG. 15, depicting eggs deposited on each of the holding and weighing stations with the lifting means disposed beneath the second holding station.

FIG. 20 is an enlarged elevational view, similar to that of FIG. 19, illustrating the upward lifting of eggs from the second holding station.

FIG. 22 is an elevational view of the egg lifting means and conveyor carriage assemblies of the egg processing system.

FIG. 23 is a perspective view of an egg carriage assembly of the egg processing system of the present invention illustrating the holding members of the assembly in the open position about to engage an egg.

FIG. 25 is a side elevational view of the egg carriage assembly in the open or egg-releasing position.

FIG. 27 is a side, elevational view of the egg carriage assembly in the closed or egg-engaging position.

FIG. 28 is a perspective view of a comb assembly for engaging the prongs of the carriage assemblies of the egg conveyor.

FIG. 29 is a perspective view of one embodiment of a receiving station of the egg processing system of the present invention.

DETAILED DESCRIPTION

Figure 1:
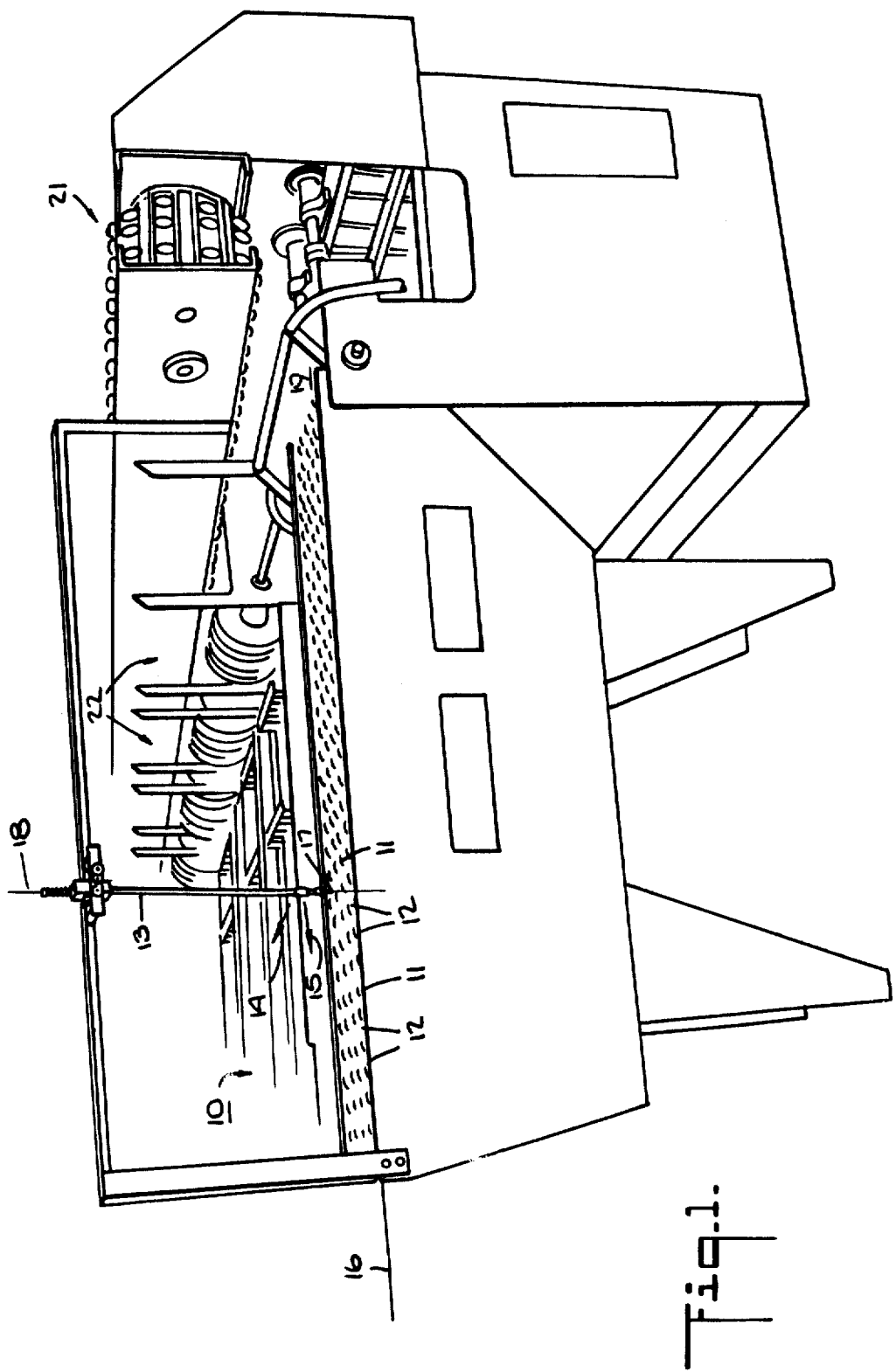
FIG. 1 is a perspective view of one embodiment of an improved egg candling system constructed in accordance with the present invention.

Referring now to the drawings, and in particular to FIG. 1, there is shown an egg candling system, generally identified by reference numeral 10, which is used in connection with an egg grader, the details of which are described and disclosed in copending applications entitled "Egg Processing System", "Egg Handling System", and "Egg Transfer System", Ser. Nos. 394,162, 394,161, and 394,443, filed simultaneously herewith.

In the candler, a mass of eggs 11 including randomly dispersed eggs having defects such as blood spots, dirt stains, rough spots, shell cracks and the like to be processed by the egg grader are continuously conveyed by a spool bar conveyor including a plurality of spool bars 12 over a high-intensity light source (see FIG. 2) to enable the visual detection of such defects by an operator standing adjacent to the conveyor. The movable spool bars 12, which comprise a plurality of concave cylinders rotatably mounted on spaced-apart, parallel axles driven at their ends in conveyor-fashion by parallel chain drives, and between which the eggs are disposed, continuously convey eggs 11 through the candler 10 in spaced-apart, aligned relationship, i.e., in aligned columns and rows over the high-intensity light source of the system. In the illustrated embodiment of the invention, the eggs are aligned in six parallel longitudinal columns on the spool bars for passage through the candler and over the high-intensity light source used to generate light beneath the spool bars and the eggs so as to enable visual detection of defects.

An elongated movable pointer or rod 13 is disposed vertically above spool bars 12 and is pivotably mounted at its upper end so as to be movable over a selected area or plane of the candling system above the spool bars 12 in mutually orthogonal directions (indicated by arrows 14 and 15), approximately parallel to the longitudinal axis 16 of the spool bar conveyor and perpendicular to longitudinal axis 16, i.e., in directions approximately parallel to the columns and rows of eggs 11 on spool bars 12. The vertically lower end 17 of pointer 13 is disposed adjacent spool bars 12 and is axially movable along its longitudinal axis 18 so that lower end 17 is movable into and out of engagement with the shells of eggs disposed on spool bars 12 within the selected area of the candler over which pointer 13 is movable. As is more fully described in the foregoing copending applications entitled "Egg Processing System" and "Egg Handling System", Ser. Nos. 394,162 and 394,161, respectively, defective eggs identified by the operator of the system are conveyed through candler 10 to an egg weighing station 19, and then by means of an egg transfer system 21 to a plurality of egg packing stations 22 where the eggs are separated according to their physical characteristics, including the type of defect detected.

Figure 2:
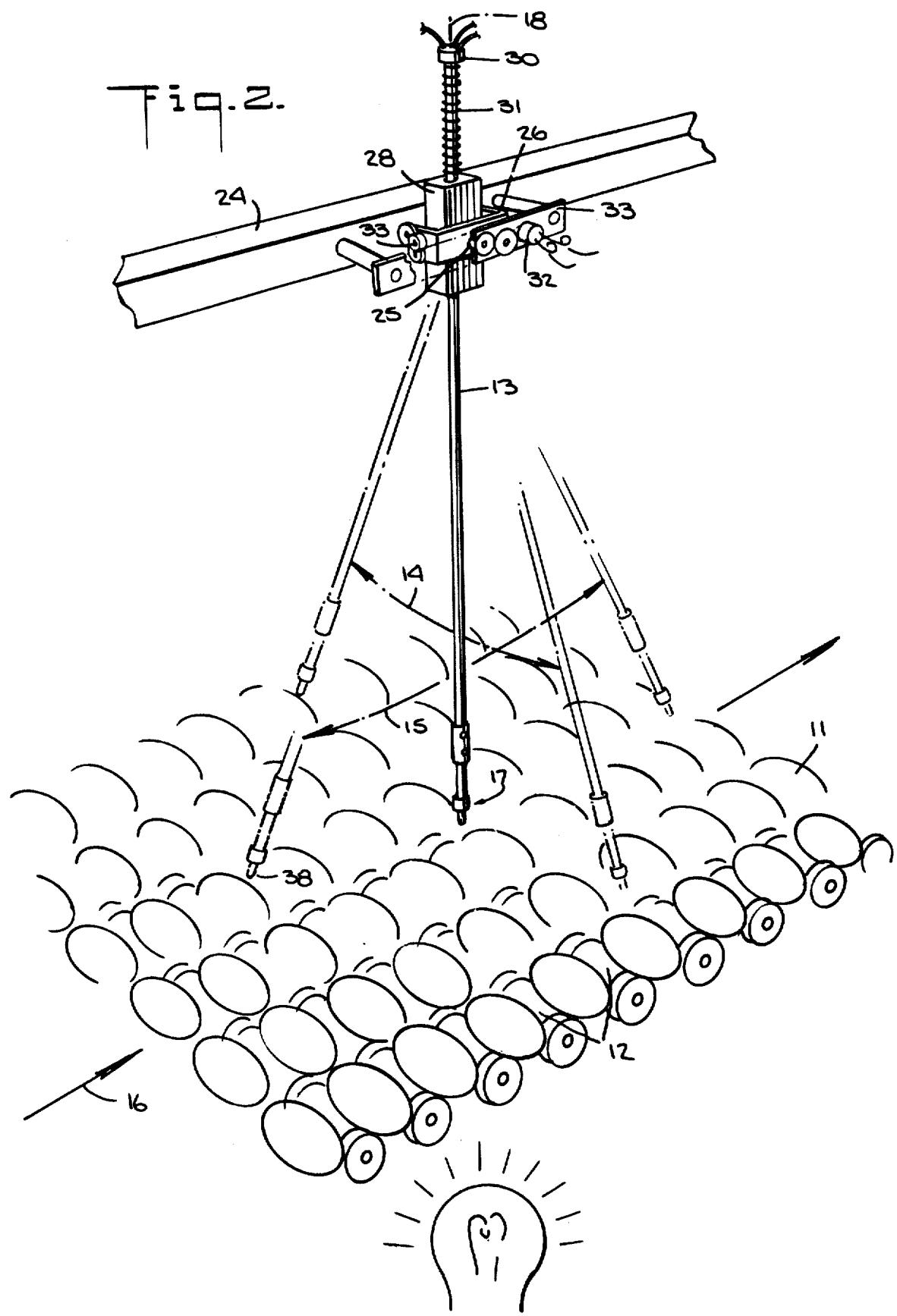
FIG. 2 is a perspective view of the movable rod of the egg candling system illustrated in FIG. 1.
Figure 3:
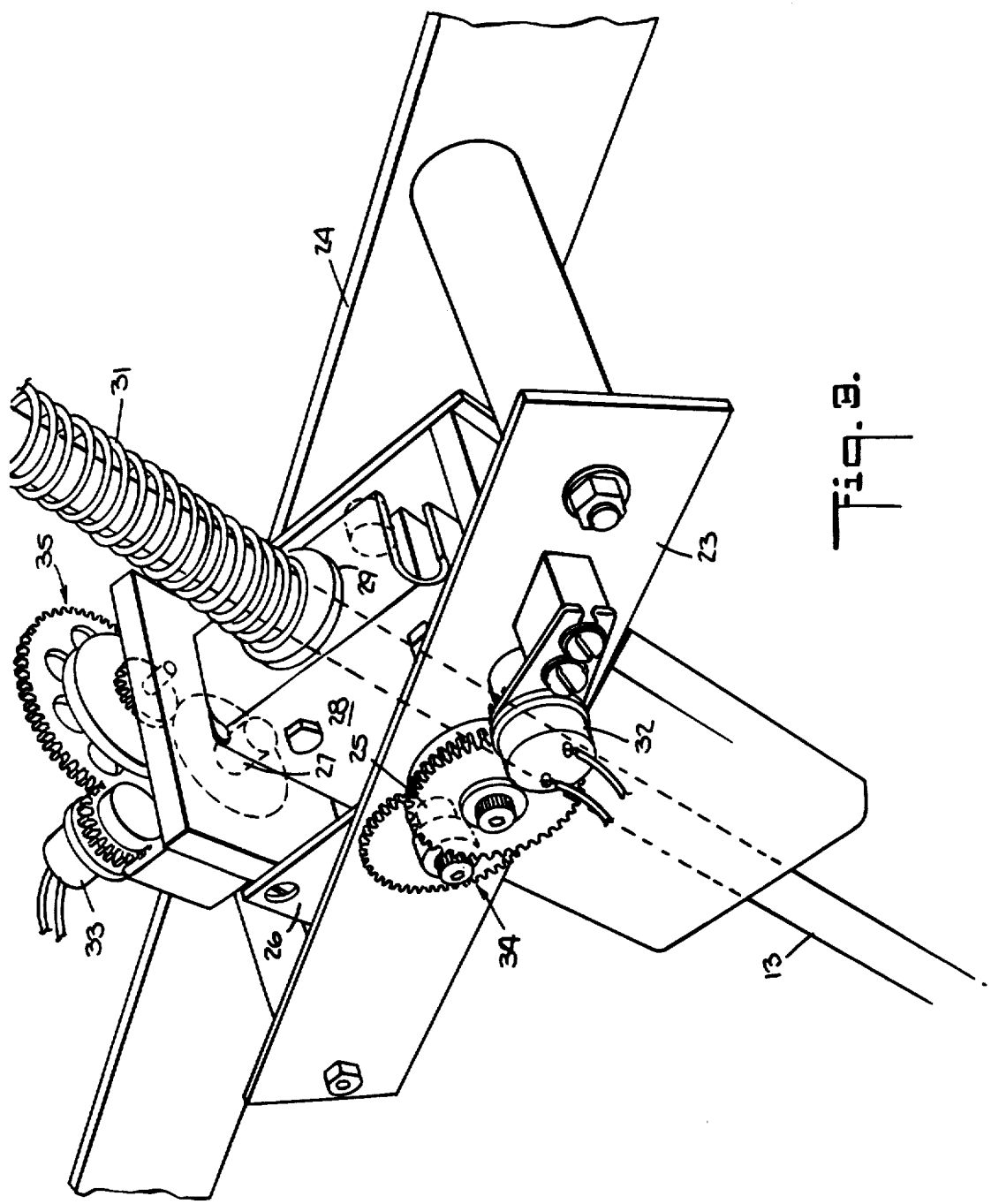
FIG. 3 is a perspective view of the mounting structure of the movable rod illustrated in FIG. 2.
Figure 4:
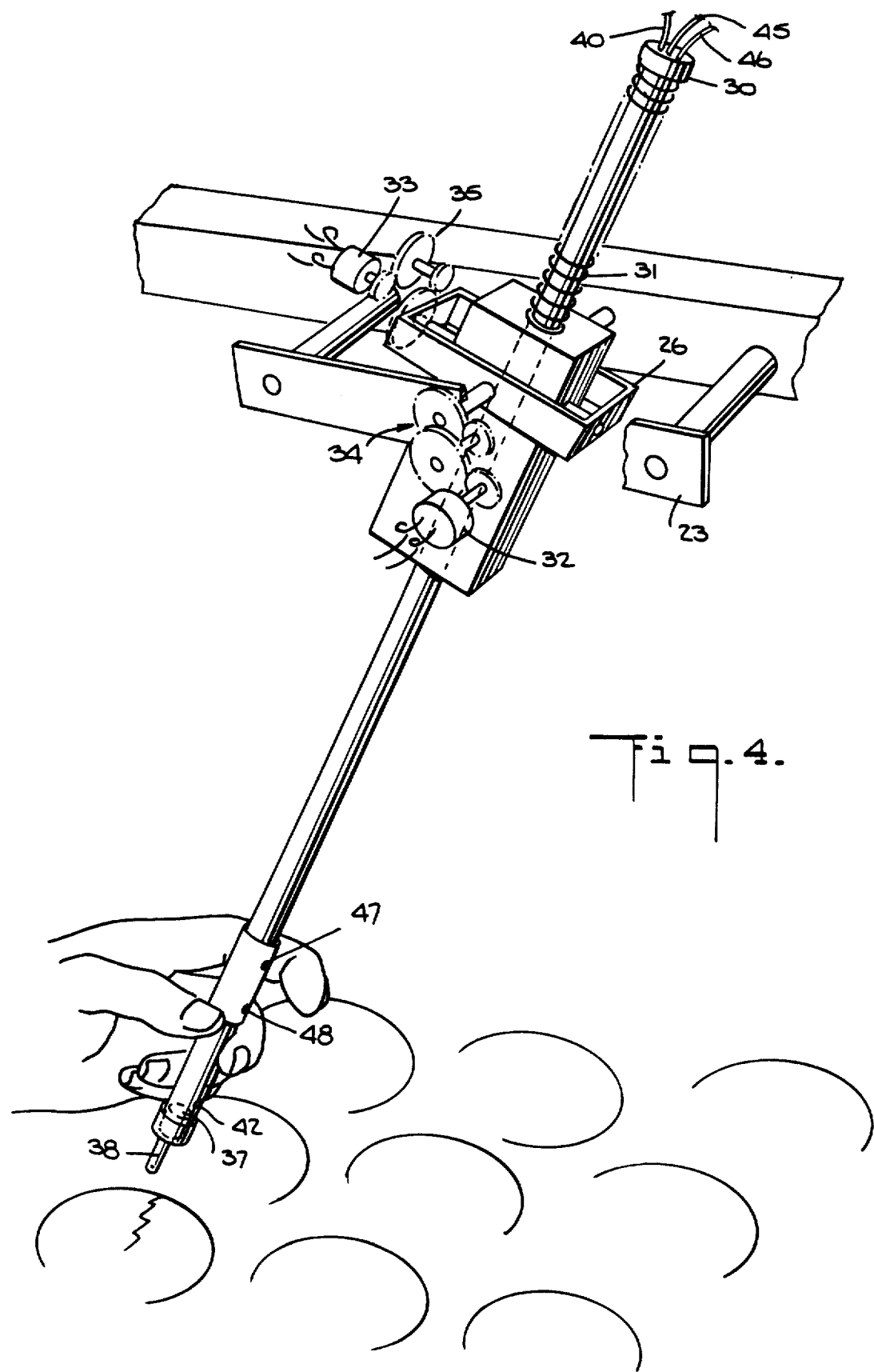
FIG. 4 is another perspective view of the rod illustrating the use of the rod to identify the location of an egg having a defect on the spool bars of the candling system, and the type of defect detected.
Figure 11:
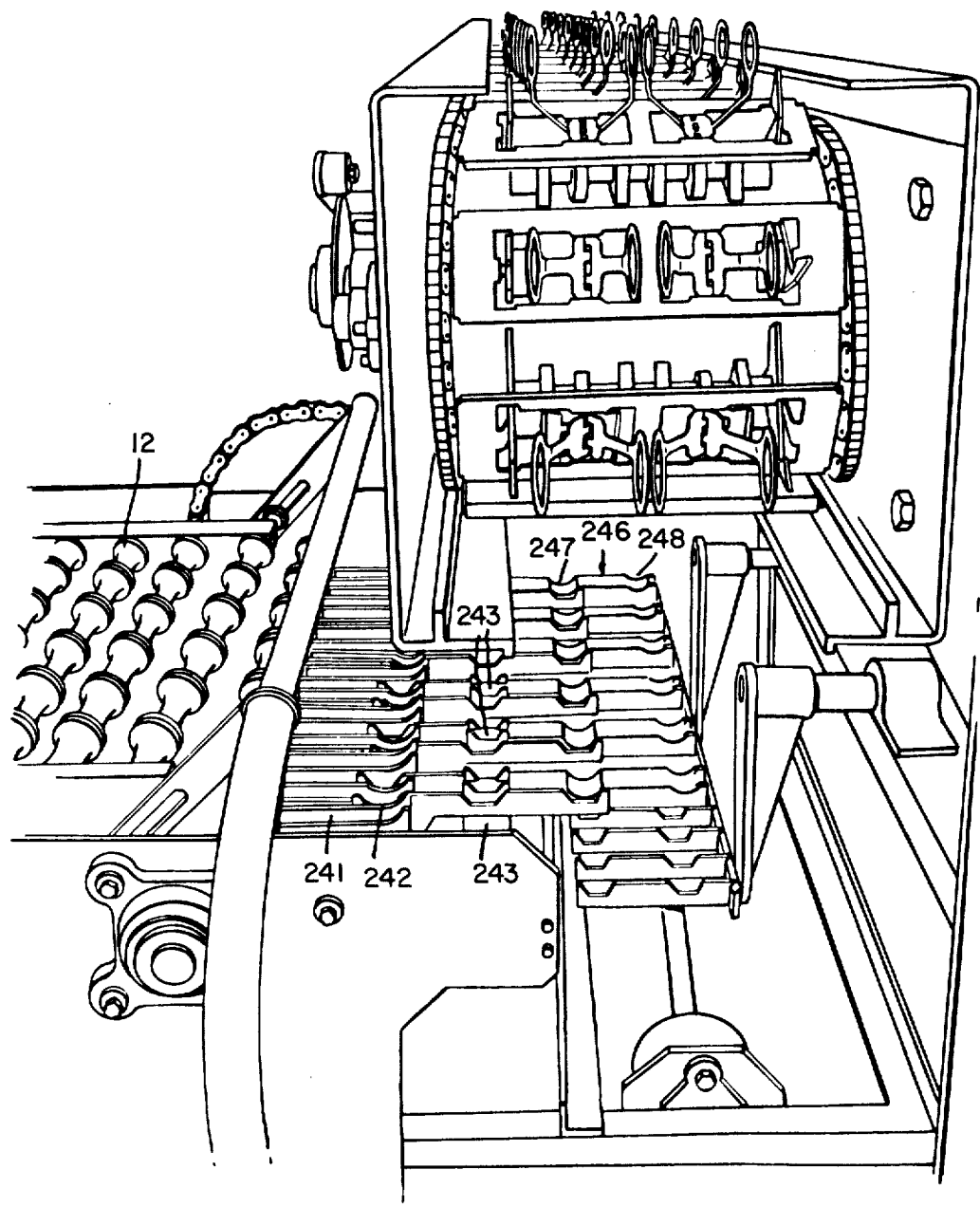
FIG. 11 is a partial perspective end view of the egg processing system of the present invention showing the candler, weighing stations, egg transfer system, and egg conveyor.
Figures 12, 13:
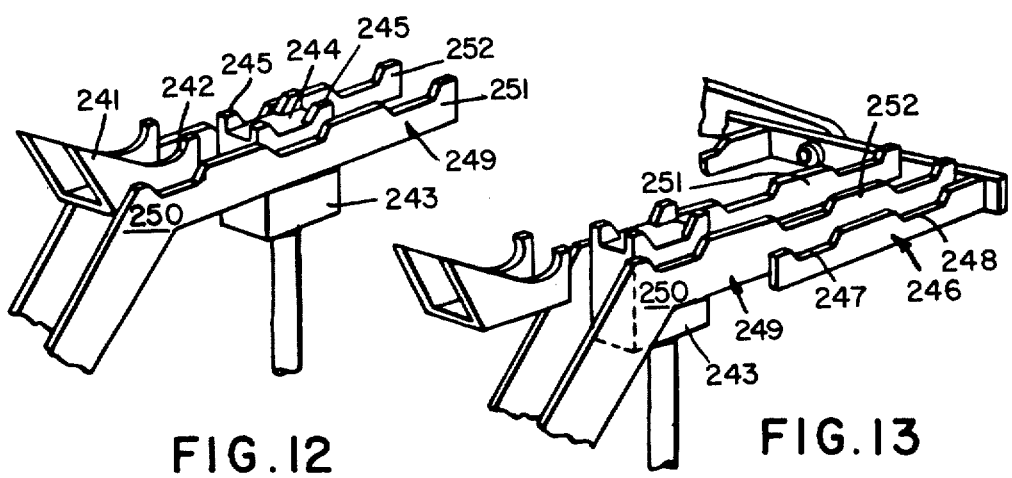
FIG. 12 is an enlarged, perspective view of the weighing station of the egg processing system.
FIG. 13 is an enlarged perspective view, similar to that of FIG. 12, illustrating the egg lifting means of the egg transfer system.

Referring now to FIGS. 2 and 3, pointer 13 is pivotally mounted in a frame 23 which is mounted on a longitudinal support beam 24 over the spool bars 12 within the selected area of the candler over which pointer 13 is movable. The frame 23, which may be either stationary or movable, includes a first axle 25 rotatably mounted in frame 23 and disposed in a direction perpendicular to the longitudinal axis 16 of the spool bar conveyor. Another frame 26 is rigidly mounted on axle 25 so as to be pivotable about the longitudinal axis thereof and includes a second axle 27, which is coupled to rod 13 by means of a rectangular-shaped frame member 28 rigidly mounted on axle 27. Axle 27 is rotatably mounted in frame 26 in a direction parallel to the longitudinal axis of the spool bar conveyor. Frame member 28 includes an aperture 29 having a diameter slightly greater than that of pointer 13 through which pointer 13 passes. The pointer has a flange 30 disposed at its vertically uppermost end which engages one end of a coil spring 31 disposed over the pointer between flange 30 and frame 28 for movably supporting pointer 13 in frame 28, and in frames 23 and 26. This arrangement permits the movement of pointer 13 in the mutually orthogonal directions 14 and 15 parallel and transversely with respect to the longitudinal axis of the spool bar conveyor, as well as longitudinally along axis 18 of pointer 13 into and out of engagement with eggs 11 on spool bars 12.

Referring now additionally to FIGS. 4 through 7, pointer 13 includes means for generating at least one signal for identifying the position of eggs 11 having a defect on spool bars 12 within the selected area of the candler when the shells of the eggs are engaged by pointer 13. In the illustrated embodiment of the invention, this signal generating means comprises potentiometers 32 and 33 coupled by a plurality of intermeshing gear wheels 34 and 35 to axles 25 and 27 mounted in frames 23 and 26. Potentiometer 32 is rigidly mounted on frame 23, and potentiometer 33 is rigidly mounted on frame 26, along with gear wheels 34 and 35, respectively.

As shown in greater detail in FIGS. 5 through 7, the signal generating means further comprises a switch, generally identified by reference numeral 36, disposed in the vertically lower end 17 of pointer 13. The switch comprises a cylinder 37 slidably disposed within the lower end of pointer 13 having an elongated portion 38 extending from aperture 39 provided in the lower end of the pointer for engaging the shells of eggs disposed within the selected area of the candler on spool bars 12. An air pressure supply source (not shown) is coupled by a tubular conduit 40 to a pneumatic switch 41 and the interior space of pointer 13. Another aperture 42 is disposed at the vertical lower end of pointer 13 in the side wall thereof adjacent cylinder 37 so that when cylinder 37 is disposed in its lowermost position in pointer 13, aperture 42 is uncovered and the air supplied through conduit 40 is permitted to escape. When portion 38 of cylinder 37 engages an egg and is pushed upwardly within pointer 13, aperture 42 is covered by cylinder 37 and the air is not permitted to escape, thus increasing air pressure within the pointer 13 and activating pneumatic switch 41.

The pointer also includes another signal generating means for generating a second signal approximately simultaneously with generation of the first signal for identifying the type of defect detected in the eggs engaged by pointer 13. In the illustrated embodiment of the invention, this signal generating means comprises manually-operable pneumatic switches 43 and 44 which are coupled at one end by tubular conduits 45 and 46 to a pressurized air supply source (not shown) and at the other end to two additional apertures 47 and 48 disposed in the lower end of pointer 13. Conduits 45 and 46 extend, as shown in FIGS. 5 through 7, through the interior of pointer 13 and are directly coupled to apertures 47 and 48, respectively, so as to communicate directly with the atmosphere. These apertures are disposed directly above aperture 42 and are manually closable by placing a finger over the apertures.

In operation, eggs 11 are conveyed on spool bars 12 beneath 13 and over the light source of candler 10. As they are conveyed through the selected area of the candler over which pointer 13 is movable, the eggs are visually inspected by an operator for defects such as blood spots, dirt stains, rough spots, shell cracks ansd the like. If defective eggs are detected by the operator, the lower end of pointer 13 is first pivoted to a position over the defective egg and then is moved downwardly, along the longitudinal axis of the rod, toward the defective egg until the egg is engaged by extended portion 38 of cylinder 37. At the same time, the operator places a finger over one or both of apertures 47 and 48, or alternatively, leaves both of the apertures open. As can be readily seen, either one of apertures 47 and 48 can be closed by the operator placing one finger over the aperture (see FIG. 7). Alternatively, both apertures can be closed by the operator, or both can remain open, thus providing four different combinations for identifying various egg defects.

When pointer 13 is moved downwardly and portion 38 of cylinder 37 engages a defective egg, aperture 42 is closed and the air under pressure entering pointer 13 is no longer permitted to escape. Pressure thus increases within the pointer and conduit 40 coupled to switch 41, thereby activating switch 41. This switch, which may be a pneumatically-actuated switch coupled to separate electrical switches connected in series with potentiometers 32 and 33, causes generation of electrical signals in analog form representing the position of the end of pointer 13 within the selected area of the candler, and thus the location of the defective egg on the spool bars 12. At the same time, when either one, both, or neither one of apertures 47 and 48 are closed by the operator, switches 43 and 44 are either individually or simultaneously activated, or are not activated, thereby generating additional electrical signals, or not generating signals, to identify the type of defect detected by the operator.

If, for example, aperture 48 is closed by the operator, the air supplied via conduit 45 no longer is permitted to escape through aperture 48 with the air pressure thus building within the conduit and thereby activating switch 43. Switch 43, which is coupled to a voltage source, thus generates one electrical signal to identify a first type of defect. Similarly, if aperture 47 were covered, switch 44 would be activated, thereby generating another electrical signal and indicating another defect. Either of these signals may be digital signals representing the closed and open conditions of the switches. If neither aperture is covered, the absence of an electrical signal indicates still another type of defect. Since pointer 13 is mounted by means of spring 31 on frame 28, after the operator engages a defective egg the pointer retracts to a position away from the eggs on spool bars 12. Switches 41, 43 and 44 are deactivated, and the pointer is returned to its condition in which it is ready to be used to identify the location of another defective egg, when cylinder 37 uncovers aperture 42 and the operator removes his fingers from apertures 47 and 48.

Referring now to FIGS. 8 and 9, the electrical signals generated to identify the location of defective eggs on spool bars 12 comprise a first electrical signal, generated by potentiometer 32, representing the arc tan of A/H, where H represents the vertical height of axle 25 above the center of the eggs 11 disposed on spool bars 12, and A represents the horizontal distance along the longitudinal axis of the spool bar conveyor (i.e., in direction 15 in FIG. 2) between a first position 49 of lower end 17 of pointer 13 when the pointer is disposed in a vertical position perpendicular to the spool bars 12, and a second position, for example, position 50 in FIG. 8, of the lower end of the pointer when the pointer is disposed in engagement with an egg on the spool bars having a defect. Another electrical signal is generated by potentiometer 33 representing the arc tan of B/H, where H again represents the vertical height of the axle 25 above the center of the eggs 11 on spool bars 12, and B represents the horizontal distance in a direction perpendicular to the longitudinal axis of the spool bar conveyor (direction 14 in FIG. 2) between point 50 and a third point 66. As illustrated in FIG. 8, the difference between the angles formed when the lower end of pointer 13 is disposed directly over the spool bars 12 determines the boundaries of the locations within which the eggs on the conveyor are located.

The signals generated by potentiometers 32 and 33 and switches 41, 43 and 44 may be utilized to actuate components of the egg grader with which the candler is used to separate the defective eggs at a particular location in the egg grader, as described, for example, in the aforementioned U.S. Pat. No. 4,164,291. These signals could also be transmitted to a microprocessor for comparison to values stored in a look-up table in a memory providing the location of the angles associated with the various vertically inclined positions of pointer 13 with respect to the spool bar conveyor and actuate the grader accordingly to separate the defective eggs from the remainder of the eggs. For example, when switch 41 is activated by engagement of a defective egg by extended portion 38 of cylinder 37, the electrical signals generated by potentiometers 31 and 33 could be compared with voltages stored in the memory representing the various angles of pointer 13 in longitudinal and transverse directions 14 and 15 with respect to its vertical position, and thus the location of the defective egg on the spool bars. Such a system is, however, merely exemplary and there are other systems for achieving separation using such signals which are well known in the art and accordingly will not be described in detail herein. Further details of the operation of the candling system as part of an egg processing system are contained in the foregoing copending applicaation Ser. No. 394,162, entitled "Egg Processing System".

Referring now to FIG. 10, there is shown an alternate embodiment of pivotal pointer 13 which may be utilized in conjunction with egg candler 10. In this embodiment, pointer 13 is slidably mounted in bushing 51 which is pivotably mounted on a trunion 52 so as to enable movement of pointer 13 in a direction parallel to the longitudinal axis of the spool bar conveyor of the candler. Similarly, another trunion (not shown) disposed transversely with respect to trunion 52 supports bushing 51 to enable movement of pointer 13 in a direction perpendicular to the longitudinal axis of the conveyor. The vertical lower end of pointer 13 includes a handle 53 in which switch buttons 54 and 55 are disposed. These switch buttons are coupled to electrical switches (not shown) which generate electrical signals when buttons 54 and 55 are pressed. Elongated portion 38 of pointer 13 is, similar to push buttons 54 and 55, coupled to an electrical switch which generates an electrical signal when the shell of an egg 11 on spool bars 12 is engaged. Bushing 51 also includes a pin 56 extending outwardly from its surface over which an oval-shaped yoke 57 is disposed. The yoke is coupled to a rod 58 which is slidably mounted in bushings 59 and 60 to permit movement thereof when pointer 13 pivots about trunion 52. A magnetic tape recording head 61 is also mounted on rod 58 and engages a magnetic tape band 62 which is driven by a pair of pulleys 63 and 64 past the recording head. A playback head 65 is also disposed in engagement with the tape band at the end thereof opposite pointer 13. Recording head 61, playback head 65, and tape band 62 have multiple channel configurations corresponding to the number of columns of eggs which are conveyed through egg candler 10 on spool bars 12. A selector switch (not shown) is coupled to pointer 13 and is actuated by transverse movement of the pointer with respect to the longitudinal axis of the spool bar conveyor to select the channel of tape band 62 for recording the column of the spool bar conveyor in which the egg engaged by the pointer is disposed.

In operation, pointer 13 is moved by the operator of the candler so that the vertical lower end thereof is disposed over the shell of a defective egg on spool bars 12. After the pointer is positioned over the defective egg, the operator then moves the pointer axially towards the egg until elongated portion 38 engages the shell of the egg and is pushed inwardly to activate the electrical switch coupled thereto thereby causing recording head 61 to record a magnetic signal on tape band 62 indicating the longitudinal position of the lower end of pointer 13. Simultaneously, the operator presses both or either one of push buttons 54 or 55 (or alternatively passes neither button) to indicate the type of defect detected in the egg engaged by the pointer. The horizontal displacement of yoke 10 caused by movement of the pointer 13 is a function of the angle formed between the vertical position of the pointer and the position of the pointer when the vertical lower end thereof is disposed a distance X along the longitudinal axis of the spool bar conveyor and is the arc tan of X/H, where H is the vertical height of the trunion 52 above the plane of the eggs on spool bars 12. In other words, the horizontal displacement of the yoke is directly proportional to the displacement of the vertically lower end of pointer 13. The selector switch coupled to pointer 13 selects the appropriate channel for recording the signal generated by the switch coupled to extended portion 38.

Referring now to FIGS. 11 through 14, the inspected eggs are conveyed through the candler 10 by rotating spool bars 12 and fed onto a first holding station or bar 241. Holding bar 241 is in the form of a U-shaped channel having a recessed section 242 at which the egg, after passing through candler 10, is positioned. The egg is fed from candler 10 by the rotating spools and is gravity fed along the inclined surface of holding bar 241 into the recessed egg receiving section 242. A series of six holding bars 241 are disposed adjacent one another, such that six eggs may be fed simultaneously from the six columns of eggs on the spool bar conveyor of candler 10 to a plurality of weighing stations 243 disposed adjacent the end of the receiving sections 242. After weighing, the eggs are transferred to the egg conveyor from the weighing stations by the simultaneous transfer of six pairs of eggs as is described later herein. Of course, other multiples of bars may be provided in accordance with the invention, e.g., twelve bars to transfer twenty-four eggs from the weighing stations to the egg conveyor if two six-column conveyors are used in the candler.

Located downstream of holding bar 241 is the weighing station 243. Each weighing station 243 has a contoured upper section having a recess 244 adapted to hold an egg and formed between the upwardly protruding prongs 245. Weighing station 243 includes a scale which is movable in a vertical direction and serves to determine accurately the weight of each egg as it is positioned thereon. The weight of each egg as determined at weighing station 243 is represented by an electrical signal generated by the scale and which is then, for example, stored in a memory device, such as a random access memory, associated with a central processor unit. Downstream of weighing station 243 is a pick-up station 246 which has provision for holding two eggs in a pair of recesses 247 and 248.

The eggs are advanced from candler 10 to the pick-up station 246 by means of the drive system illustrated in FIG. 7. An egg advancing means, illustrated as a bar 249, includes an upper horizontal section 250 formed by spaced-apart side members 251 and 252 each of which has three recesses 253, 254 and 255 for holding individual eggs. A main drive motor drives a shaft 256 (see FIG. 21) which in turn is connected to the right angle gear box 257 by drive chain 258, the output gear box 257 driving chain member 259. A pair of oppositely disposed crank members 260 are rotationally driven by chain 259 and pivotally connected to the downwardly depending arm 261 of the egg-advancing means 249. Another pair of oppositely disposed crank members 262 are similarly driven by chain 259 and pivotally connected by way of linkage 263 to the downwardly depending arm 261 of the egg-advancing bar 249. In this manner, the upper horizontal section 250 is driven in an elliptical or oval path such that the portion of the path between the holding station 241, weighing station 243 and pick-up station 246 is along the major axis of the elliptical path.

With particular reference to FIGS. 15 through 20, the advancement of an egg from holding station 241 to pick-up station 246 is described. Eggs 11 are conveyed through candler 10 by means of the spool bars 12. As the egg is rolled from the candler 10 by the last spool bar 12, it is rolled down the inclined portion of holding station 241 into the recessed egg-receiving recessed section 242. Advancing bar 249, and in particular recess 253 therein, engages the egg from the underside thereof and lifts the egg upwardly into the position depicted in FIG. 16. As advancing bar 249 is lowered along its elliptical path, the egg is moved from the recess 242 onto the scale at weighing station 243 as illustrated in FIG. 17. A second egg is then rolled down the inclined portion of holding station 241 into recessed section 242. By a similar movement of the advancing bar 249 along its elliptical path, the egg is lifted from the weighing station 243 and advanced to recess 247 at pick-up station 246 (FIG. 18). Subsequently, the egg is advanced again by advancing bar 249 into recess 248 of pick-up station 246 (FIG. 19). Once two eggs are in position at pick-up station 246, each of the eggs in recesses 247 and 248 is lifted upwardly by a lifting arm 264 which move both rotationally with respect to pick-up station 246 as well as in a direction longitudinally with respect thereto (FIG. 20). The longitudinal movement of the lifting arm 264 with respect to pick-up station 246 serves to move the lifted eggs away from pick-up station 246 as the advancing means 249 is moving a subsequent egg into the recesses 247 and 248.

Figure 14:
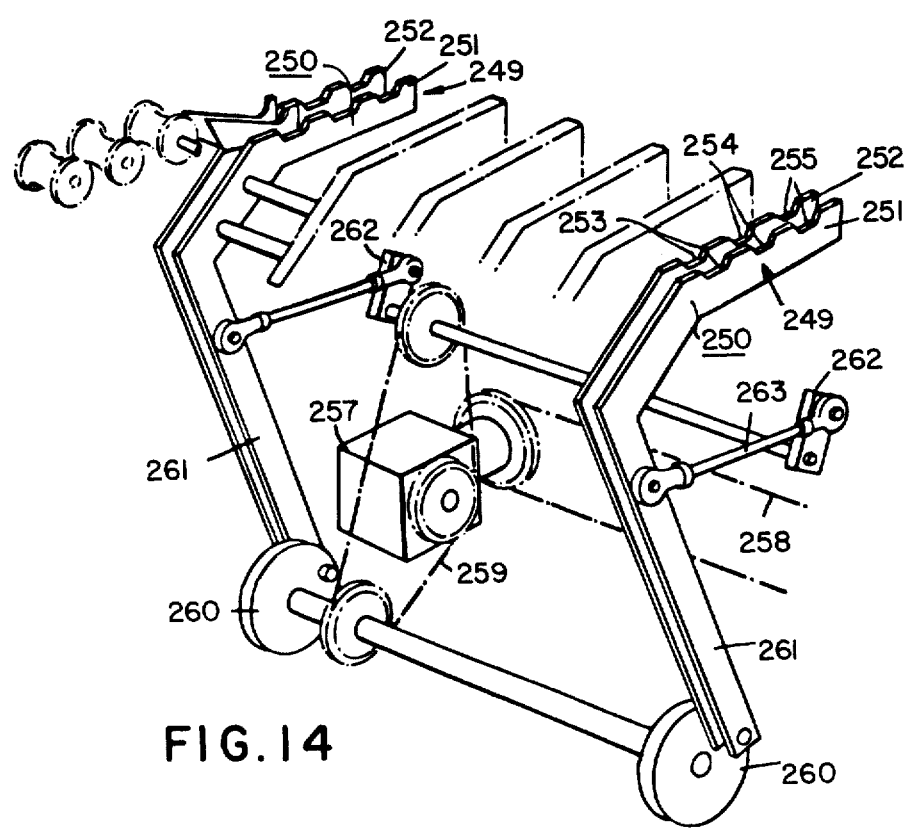
FIG. 14 is a perspective view of the egg advancing means drive system of the egg transfer system.
Figure 21:
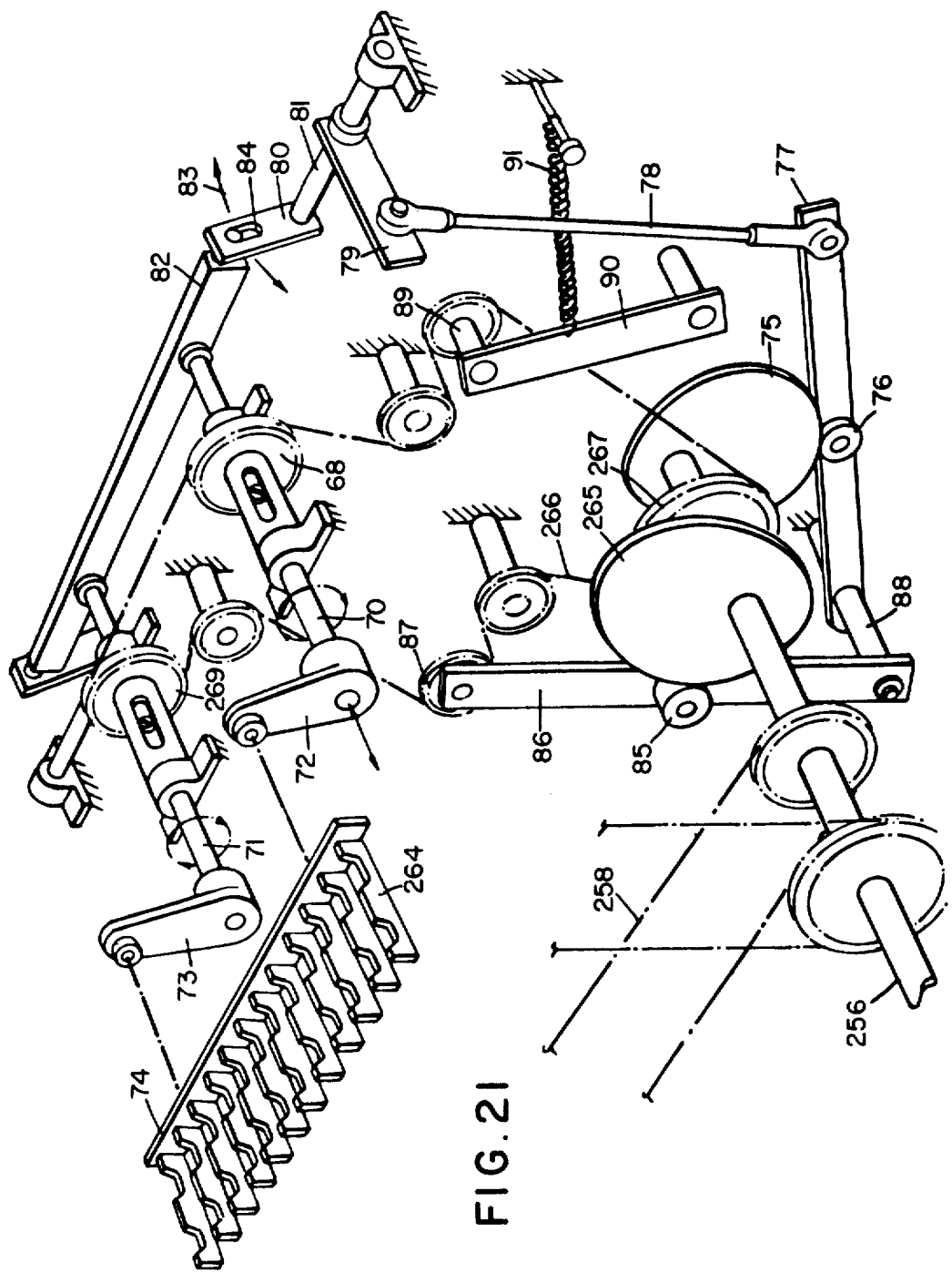
FIG. 21 is a perspective view of the lifting means drive system of the egg transfer system.

With reference particularly to FIG. 21, the drive system for lifting arm 264 is illustrated. A main drive motor is coupled to drive shaft 256 which has mounted thereon a differential speed cam 265 and sprocket-driven chains 258 and 266. Chain 258, as previously explained, provides the drive for advancing bar 249 (FIG. 14). Chain 266, which is driven by sprocket 267, in turn serves to drive a pair of differential speed-drive sprockets 268 and 269. Each of the sprockets 268 and 269 drives the respective shafts 70 and 71 in a counterclockwise direction, the shafts having mounted on the ends thereof crank arms 72 and 73, respectively. Each rotary crank arm 72 and 73 is fastened to an elongated support bar 74 on which twelve (12) individual lifting plates, which form lifting arm 264, are mounted, each adjacently spaced pair of lifting plates serving to lift an egg. Support bar 74 thus facilitates the simultaneous lifting of two rows of six side-by-side eggs. In other words, the adjacently spaced lifting plates serve to lift simultaneously twelve (12) eggs from the six pick-up stations 246 provided in the egg grader and transfer the eggs in adjacent pairs to the egg conveyor.

A cam 75 is mounted at the end of main drive shaft 56 and is engaged by a cam follower 76 mounted on a pivotable arm 77 which in turn is connected at the end thereof to a connecting linkage 78. Linkage 78 is pivotally connected to a right-angle drive arm 79 which in turn drives a coupling bar 80 with an oscillating motion about a shaft 81. A drive bar 82 is reciprocally driven in a direction toward and away from pick-up stations 46 by means of coupling bar 80 which is connected thereto via a pin 83 slidably mounted in a slot 84.

Cam 265 is in rotational engagement with a cam follower 85 mounted on an arm 86 which has mounted at its upper end an idler 87 and at its lower end is pivotally connected by a shaft 88 to pivotable arm 77. Chain 266 is further routed over idler sprocket 89 which in turn is mounted to an idler arm 90 fastened to a spring 91. In this manner, the spring loaded idler arm 90 serves to maintain tension in the drive chain 266 while support bar 74 is driven both rotationally and longitudinally with respect to pick-up stations 246. Further, differential speed cam 265 serves to regulate the rotational drive speed of lifting arm 264 such that when the plates of the arm arrive at the pick-up stations 246 (when the eggs are being removed therefrom), the rotational speed of the lifting arm is decreased to facilitate the smooth upward lifting of the egg from the pick-up stations.

In this latter connection, reference is made to FIG. 22 in which the rotational movement of the crank arm 72 and lifting arm 264 is illustrated. As illustrated, the plates of lifting arm 264 engage the eggs from the underside thereof at pick-up stations 246, which are positioned in the rotational path of arm 264 at approximately the nine o'clock position. Arm 264 is then rotated clockwise while also being moved longitudinally away from pick-up stations 246. At the twelve o'clock position each of the eggs is brought within the depending arms of carriage assemblies 92 which are part of the egg conveyor and are driven by a chain 93. At this position, both the eggs and carriage assembly should be travelling at the same speed to properly effect transfer.

Referring now to FIGS. 23-27, each carriage assembly 92 includes a sheet metal platform 94 which has mounted thereon a pair of depending prongs or egg-engaging members 95. Prongs 95 are pivotally mounted and positioned opposite one another in order to engage an egg therebetween across its smaller side or width. The lower portion of each prong 95 is curved so as to approximate the curvature across the smaller width of the egg, and the upper portion of each prong is reversely bent so as to provide a surface having a generally horizontal orientation. The reversely-bent portion of each prong is mounted on a fixed shaft 96 so as to be pivotally movable with respect thereto. The prongs are mounted over shaft 96 with the reversely bent portions thereof disposed in opposing relationship.

A mounting shaft 97 is positioned on the platform 94 generally perpendicular with respect to the fixed shafts 96. Cam members 98 have a generally square profile and are pivotally mounted on shaft 97 with the operative bottom flat surface being in engagement with the horizontal surface of reversely-bent portions of egg-engaging prongs 95. An integral spacer 99 is disposed between adjacent cam members 98 in order to maintain the proper spacing and engagement of the horizontal cam-engaging surface with the horizontal surface of egg-engaging prongs 95.

Coupled to each end of the cam members 98 is an extension bar 100 which is spaced from the end cam member 98 by integral spacer 101. Bar 100 is provided with an upper T-shaped portion 102 which is engageable with the latch pins of a comb assembly and solenoid-actuated plungers described later herein, in order to cause rotational movement thereof. Each bar 100 is fastened or directly coupled to the adjacent spacer 101, cam 98, intermediate spacer 99 and the adjacent cam 98. In this manner, each pair of egg-engaging prongs 95 is operable independently of the others although mounted to a common shaft 97.

Lifting arm 264 rotates about an axis offset from the line formed between holding stations 41, weighing stations 43 and pick-up stations 46 so that each pair of eggs disposed at pick-up stations 246 is engged from the underside thereof when the lifting arm 264 reaches approximately a nine o'clock position (looking from the rear of the machine). As arm 264 is moved upwardly from pick-up stations 246, reciprocating drive bar 82 moves the lifting arm assembly away from stations 246 so as to avoid any collision between the eggs being removed from the pick-up stations and the eggs being advanced thereto. Once the eggs are in a position coincident with the approximate center of prongs 95 (approximately the twelve o'clock position), a comb assembly 103 (FIG. 28) is positioned in the path of the lower surface 118 of the extension bars 100. Each carriage assembly 92 arrives at comb assembly 103 with bar 100 in the position depicted in FIG. 25, i.e., in its open position ready to receive the eggs.

Comb assembly 103 consists of two elongated bar members 104 and 105 disposed adjacent to the travel path 106 of the carriage assemblies on the egg conveyor and on which a plurality of inwardly directed latch pins 107 are disposed. The bar members are mounted on a pair of U-shaped, downwardly-extending support members 108 and 109 which are in turn connected to a pair of rotatable rods 110 and 111. The rods are connected by means of a linkage 112 to a crank arm 113 and a cam follower 114 mounted at the end of the crank arm which engages a cam 115 mounted on a shaft 116 driven by a chain and sprocket drive assembly 117 which is connected to shaft 256 coupled to the main drive motor. The comb assembly includes twelve latch pins 107 for engaging the lower surface 118 of twelve extension bars 100 of the carriage assemblies for closing twelve pairs of prongs on twelve eggs simultaneously during operation of the conveyor.

In operation, egg-engaging prongs 95 are in an open position when passed adjacent the path of the rotating lifting arm 264. In this manner, each carriage assembly 92 arrives at the comb assembly with bars 100 in the position depicted in FIG. 25. When the eggs are in a position coincident with the approximate center of prongs 95, the latch pins of the comb assembly 103 are positioned in the path of extension bars 100. Comb assembly 103 closes or latches prongs 95 on twelve eggs simultaneously. Each prong of comb assembly 103 engages a lower surface 118 of extension bars 100 (FIG.

Figure 24:
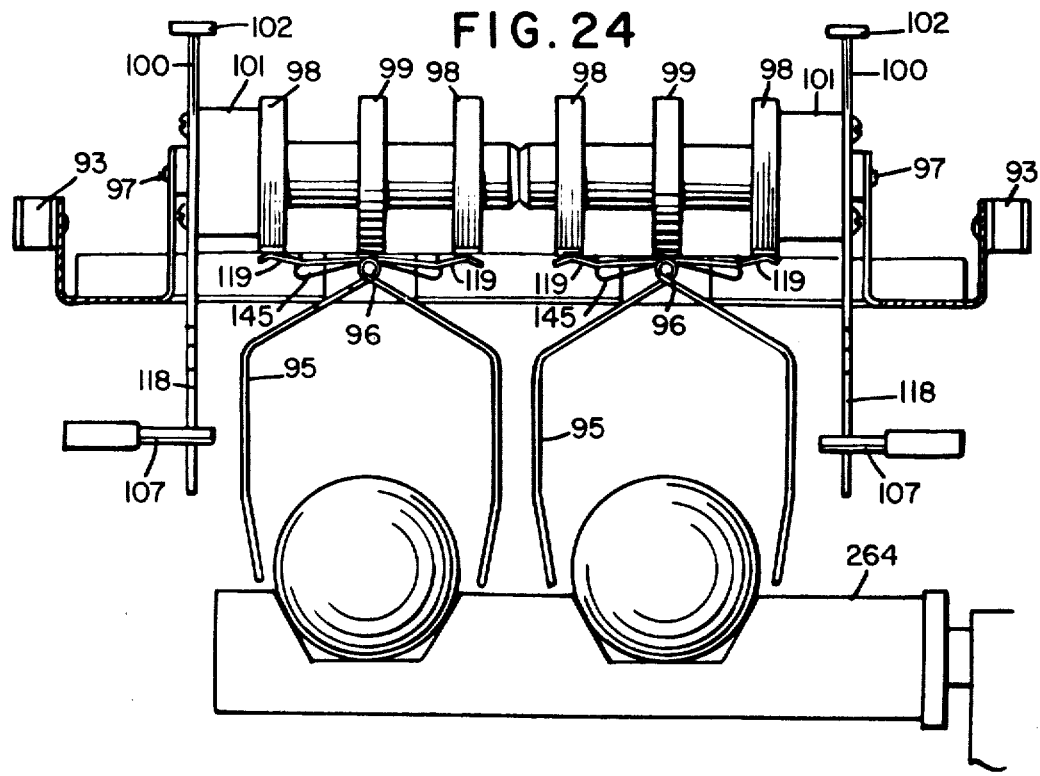
FIG. 24 is a front, elevational view of the egg carriage assembly with the egg-engaging members in the open position.
Figure 26:
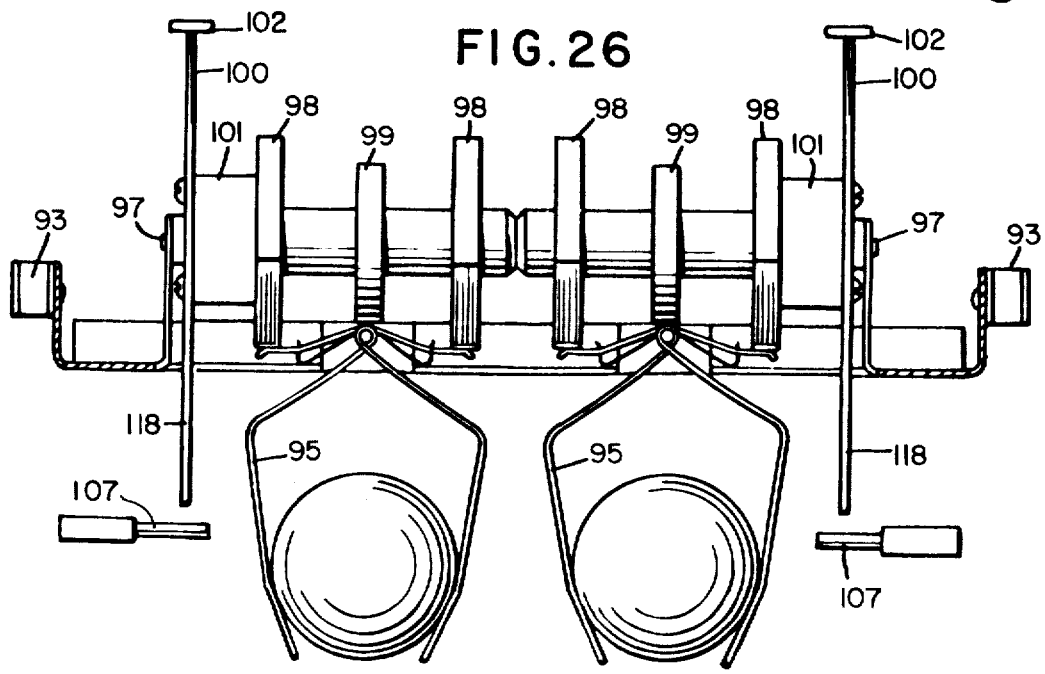
FIG. 26 is a front elevational view of the egg carriage assembly with the egg-engaging members in the closed position.

25) causing the same to rotate in a clockwise direction while rotating cam members 98 therewith. Cams 98 are rotated approximately 45° such that the angular or corner portion thereof downwardly depresses a horizontal surface 119 of the egg-engaging prongs 95 (FIG. 24). The downward movment of the generally horizontal cam-engaging surface causes the lower egg-engaging portion of prongs 95 to move inward with respect to one another and close in an engaging relationship with the egg. In this manner, the egg is lifted from lifting arm 264 by the prongs and conveyed to the receiving stations downstream in the machine. When bars 100 are pivotally moved into the closed position illustrated in FIG. 27, the lower portions 120 thereof engage platform 94 which in turn limits the rotational movement thereof.

Further details of the construction and operation of the foregoing portion of the egg processing system are contained in copending application Ser. Nos. 394,443 and 394,430, filed July 1, 1982 and July 1, 1982, respectively, and entitled EGG TRANSFER SYSTEM and EGG CARRIER.

Figure 30:
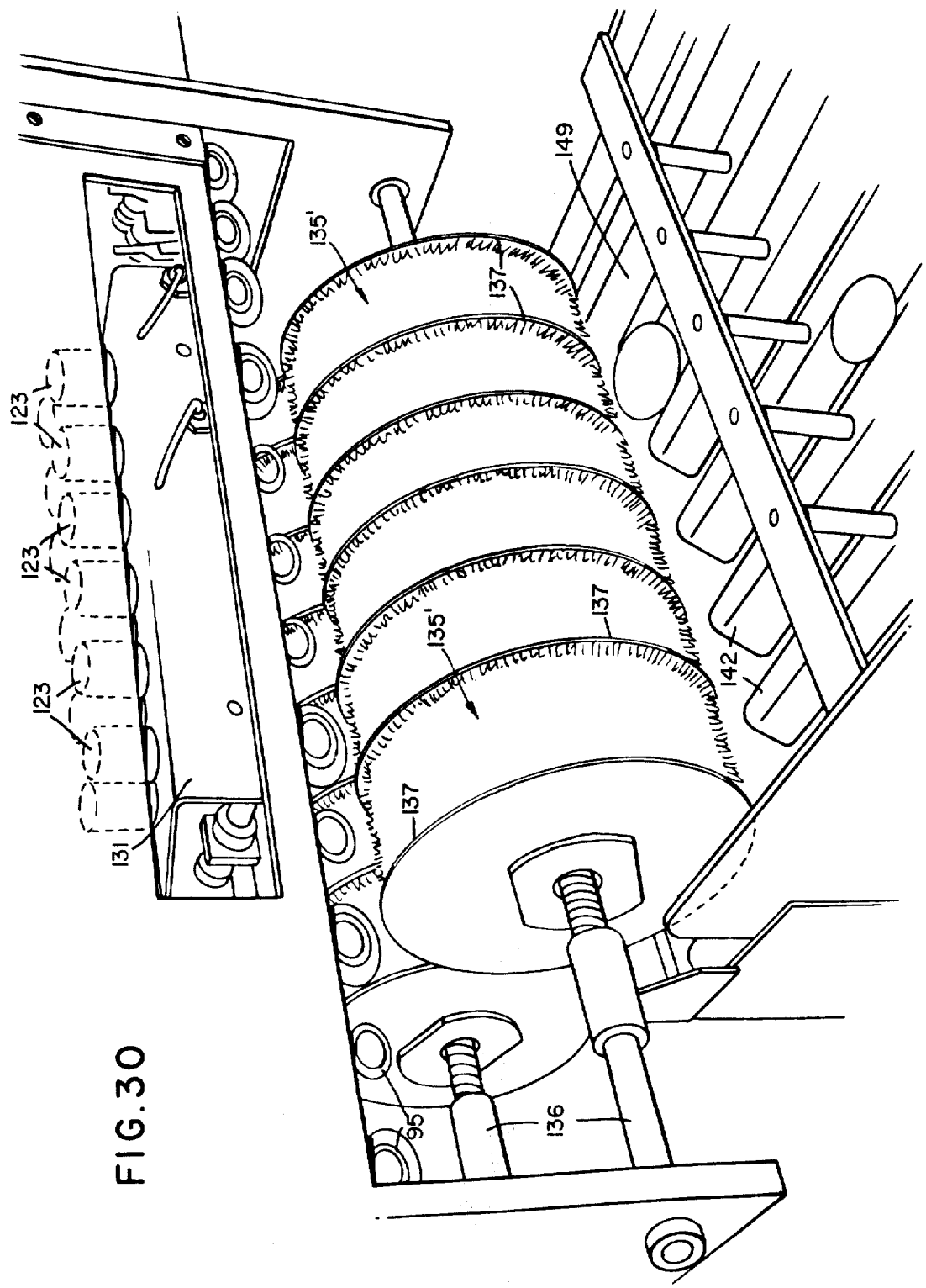
FIG. 30 is a partial, perspective view of the receiving station illustrated in FIG. 29.
Figure 31:
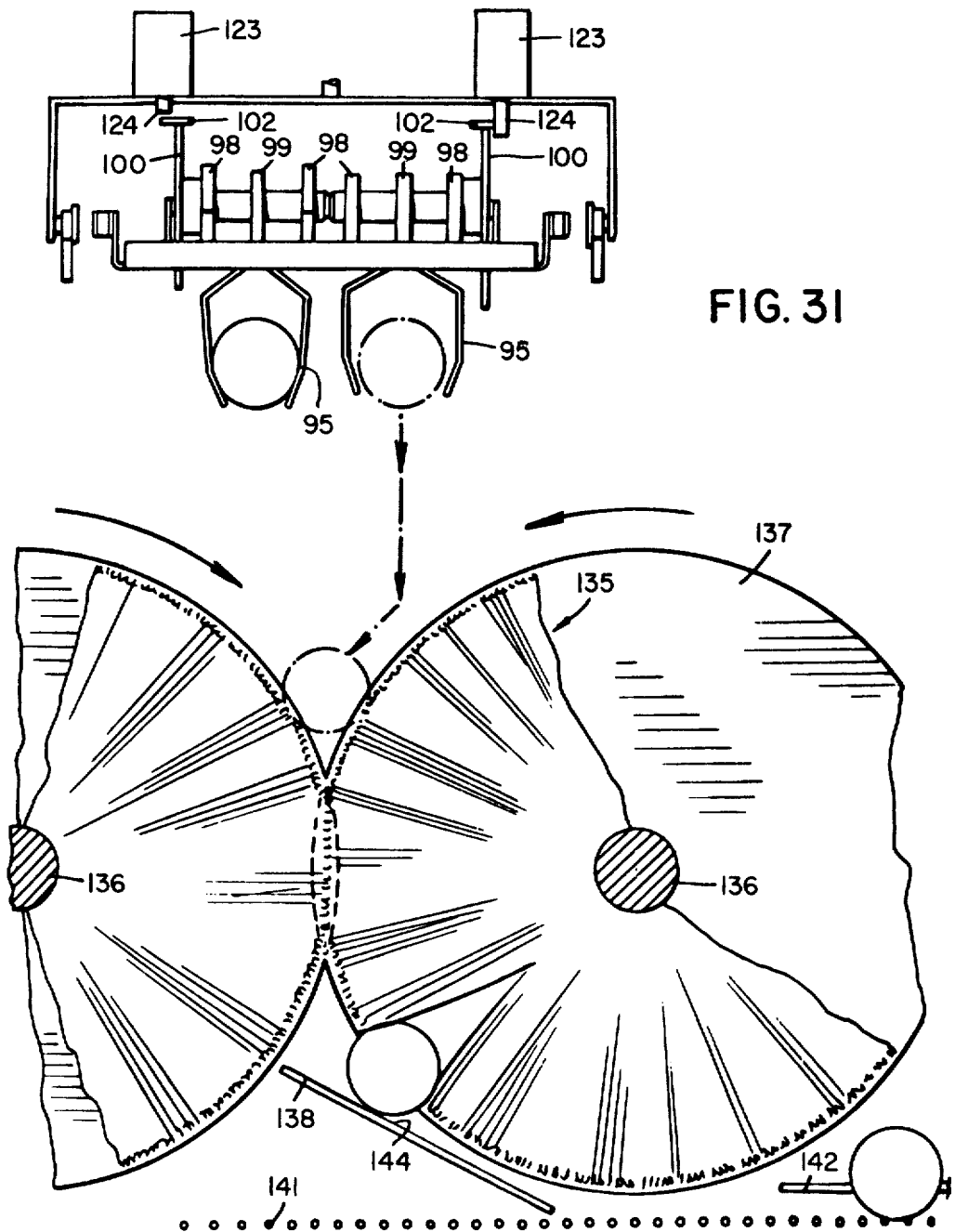
FIG. 31 is a cross-sectional view of the receiving station.

Referring now to FIGS. 29 through 31, the receiving stations of the egg processing system receive eggs carried in adjacent pairs by carriage assemblies 92. The carriage assemblies 92 convey the eggs in spaced-apart, side-by-side pairs to the receiving stations and are coupled to common chain members 93 on each side of the conveyor which drive the carriage assemblies. At each receiving station, a movable frame 121 (see FIG. 29) on which a plurality of solenoids 123, which activate plungers 124, are mounted, is slidably disposed on rails 125 located adjacent the chain members 93. The frame is coupled to a hydraulic cylinder 126 by means of an extension rod 127. A compression spring 128 is disposed over rod 127 and engages a stationary guide member 129 mounted on the rod at one end and a circular collar 130 mounted on the rod in spaced-apart relationship with respect to member 129 at its other end. The extension rod is rigidly coupled to frame 121 by means of another circular collar member 131. Cylinder 126 is coupled by a hydraulic pressure line 132 to a hydraulic pump 133 which is driven by a stepping motor 134 which also serves as the main drive motor for the egg conveyor.

Movable frame 121 is disposed over a pair of rotatable resilient cylinders 135 which are coaxially mounted on spaced drive shafts 136. In the embodiment of the invention illustrated in FIGS. 29–31, the cylinders comprise cylindrical brushes preferably fabricated with nylon bristles. A plurality of rotatable disks 137 are mounted on shafts 136 in order to define a plurality of channels in the cylinders for receiving eggs from the carriage assemblies. The cylinders are disposed vertically below movable frame 121 and carriage assemblies 92 and have their peripheral ends engaging and in slight interference with those of the adjacent cylinder. The peripheral end of the forwardmost cylinder is further disposed in a generally contiguous relationship with an elongated, flexible support member 138, which may comprise a sheet of plastic, such as mylar, stretched over and mounted on a frame extending axially along substantially the entire length of the cylinders. A conveyor belt 141, which may comprise a wire conveyor or a plurality of elongated strand members moving axially along the length of the conveyor, is disposed below the cylinders for conveying eggs received therefrom to an egg packer (not shown) which packs the eggs in cartons or trays as desired. Conveyor belt 141 is divided into a plurality of channels aligned with those formed in the cylinders by disks 137 by means of a plurality of elongated stationary guide members 142 (FIG. 30) which, in the illustrated embodiment of the invention, are disposed over the conveyor belt in close proximity thereto and have an inverted, V-shaped profile (i.e., are upwardly convex). Suitable drive means, such as an electric motor, is coupled to shafts 136 for rotating the cylinders so that the peripheral edges thereof rotate in opposite directions inwardly towards each other and downwardly and away from carriage assemblies 92, i.e., in a counter-clockwise direction. As can be readily seen in FIG. 31, support member 138 is upwardly inclined toward the rearwardmost shaft 136 with respect to the direction of movement of conveyor 141 and its uppermost surface 144 is disposed beneath and slightly spaced from the peripheral ends of cylinders 135. This surface may also be curved in a direction substantially in conformance with that of the forwardmost one of the cylinders in order to maintain contact between cylinders 135 and the eggs guided along member 138 onto conveyor 141.

Figure 32:
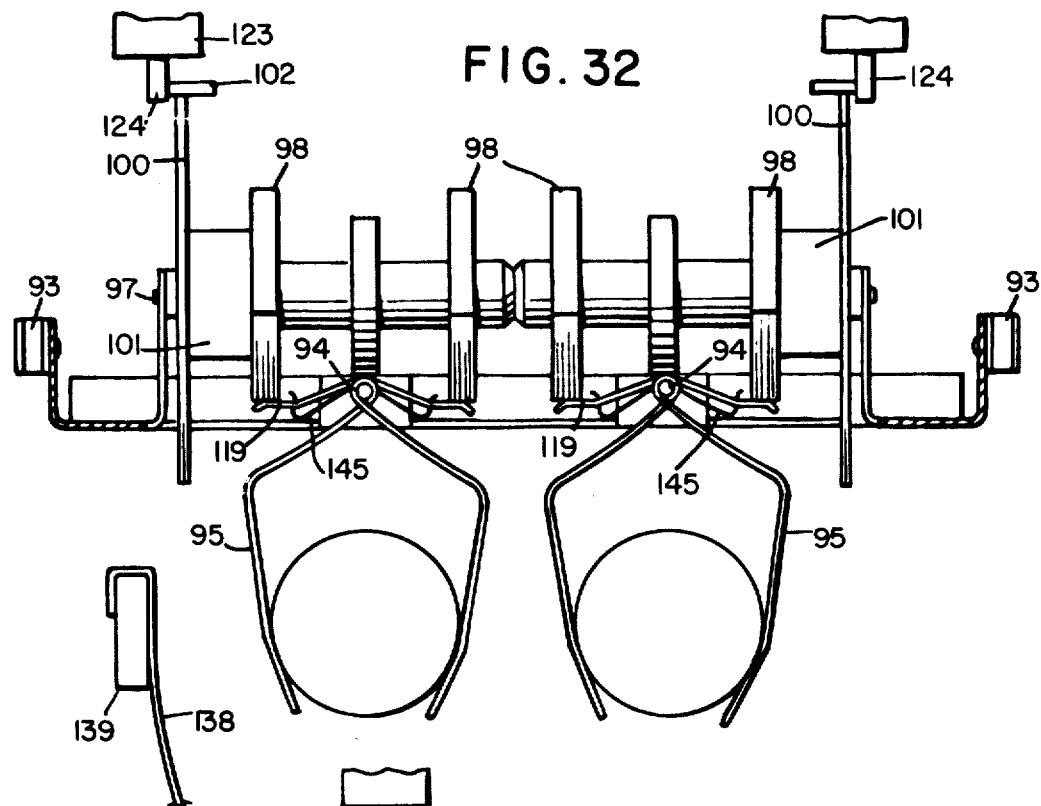
FIG. 32 is a cross-sectional view of the egg conveyor at the receiving station.
Figure 33:
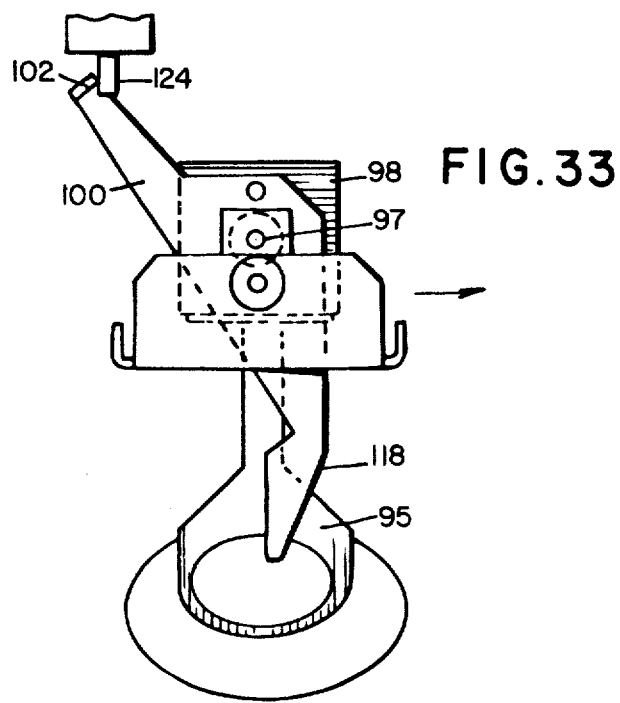
FIG. 33 is a partial longitudinal cross-sectional view of the egg conveyor at the receiving station.

In operation, eggs are carried by the prongs 95 of carriage assemblies 92 as illustrated in FIGS. 32 and 33 until they reach a receiving station of the egg grader. When the eggs arrive above the appropriate station, solenoids 123 are selectively actuated as described in copending application Ser. No. 394,161, filed July 1, 1982, entitled EGG HANDLING SYSTEM. Plungers 124 of solenoids 123 engage the upper T-sections 102 of extension bars 100 and cause the bars to rotate in a counter-clockwise direction about shaft 97, thereby releasing the eggs from the carriage assemblies. When plungers 124 are moved into the path of the carriage assemblies and engage T-sections 102 of the extension bars, the counter-clockwise rotation of the bars causes prongs 95 to pivot outwardly with respect to one another due to the force of spring 145 which urges prongs 95 toward their open position. The eggs are then released from the prongs, drop downwardly as shown in FIG. 31, and are caught by the cylinders 135 which slow the speed at which the eggs are falling and gently move the eggs downwardly and outwardly away from carriage assemblies 92 to support member 138 and into the channels of conveyor 141, which operates at a speed which is substantially less than that of the assembly conveyor.

Frame 121 is movable with respect to the cylinders 135 to accommodate variations or changes in the speed of carriage assemblies 92 which may vary during operation, depending upon the speed of the candler and weighing systems of the egg grader. As it varies, the position of frame 121 also varies with respect to cylinders 135 and the channels leading to the packer at each receiving station to compensate for changes in the forward drop trajectory of the eggs being released by prongs 95 at different conveyor speeds to assure that the eggs are received in the channels for which they are intended.

For example, when the speed of stepper motor 134 is increased by the operator of the system, the speed of assemblies 92 will also increase since the motor drive is coupled to the drive mechanism for the egg conveyor. Also, since pump 133 is coupled by a hydraulic line 145 to a valve 146 which is connected by a coupling 147 to hydraulic line 132 and is adjusted so that as the speed of motor 134 and assemblies 92 is increased, the flow of hydraulic fluid from pump 133 is controlled so as to cause hydraulic cylinder 126 to advance frame 121 in a direction opposite to the direction of movement of carriage assemblies 92 to a position sufficient to compensate for the forward trajectory of eggs released at that particular speed. The linear distance between frame 121 and prongs 95 of the carriage assemblies carrying the eggs to be released thus becomes effectively shorter. If the speed of assemblies 92 decreases, cylinder 126 similarly moves frame 121 in the opposite direction, i.e., in the same direction as the direction of movement of the carriage assemblies, to another position sufficient to compensate for the smaller forward drop trajectory of the eggs at the lower speed.

Figure 34:
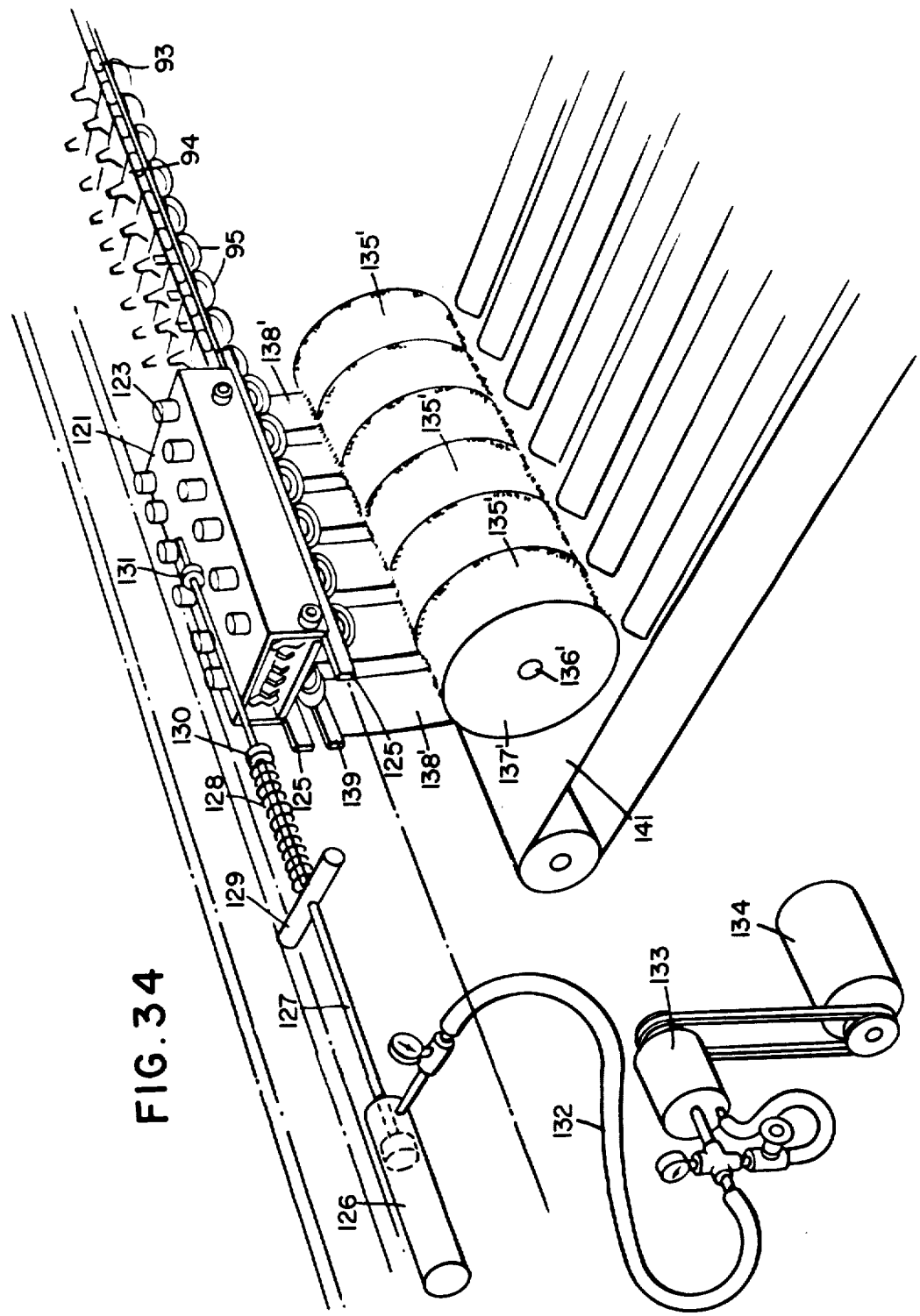
FIG. 34 is a perspective view of another embodiment of a receiving station of the egg processing system of the present invention.
Figure 35:
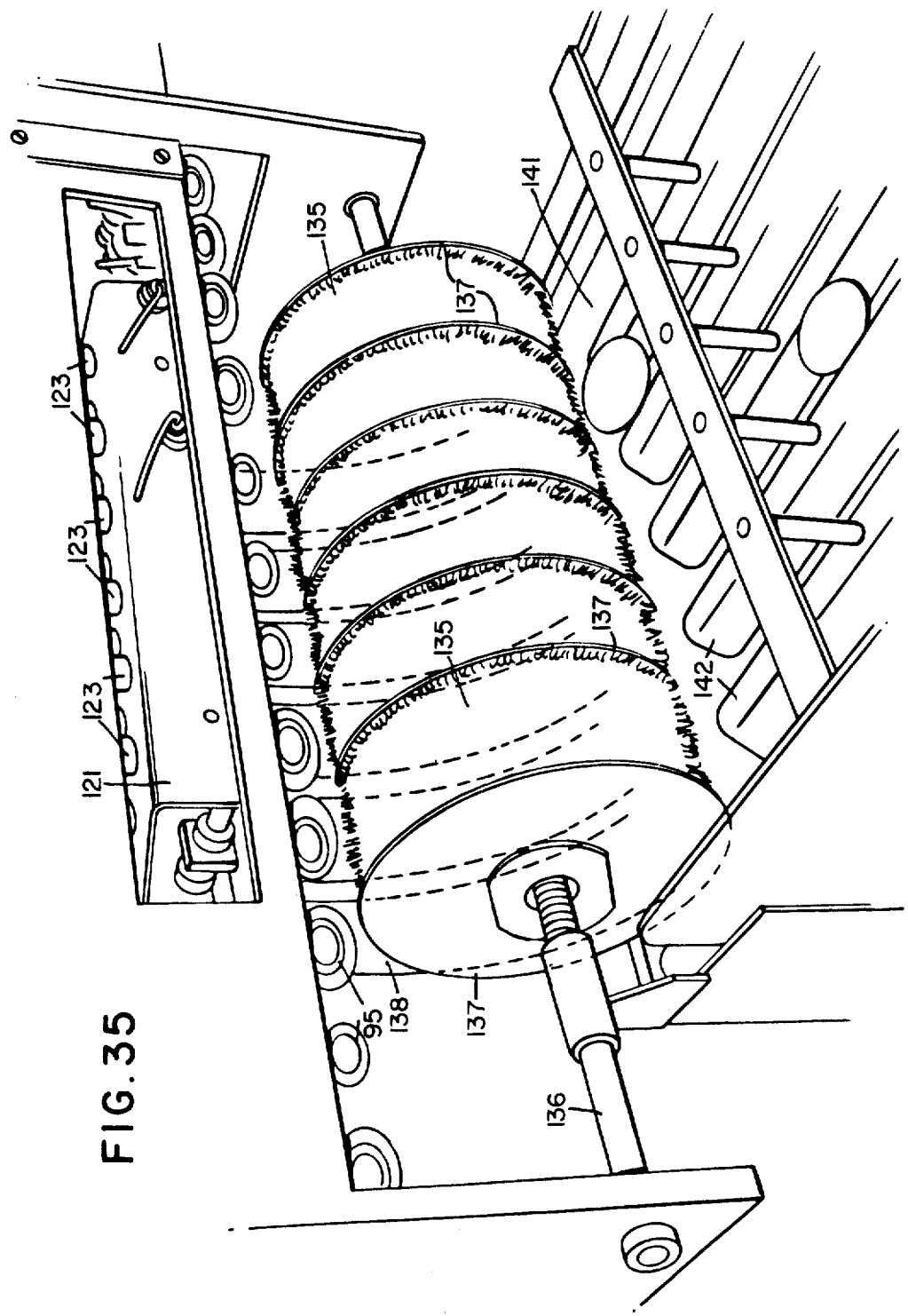
FIG. 35 is a partial, perspective view of the receiving station illustrated in FIG. 34.
Figure 36:
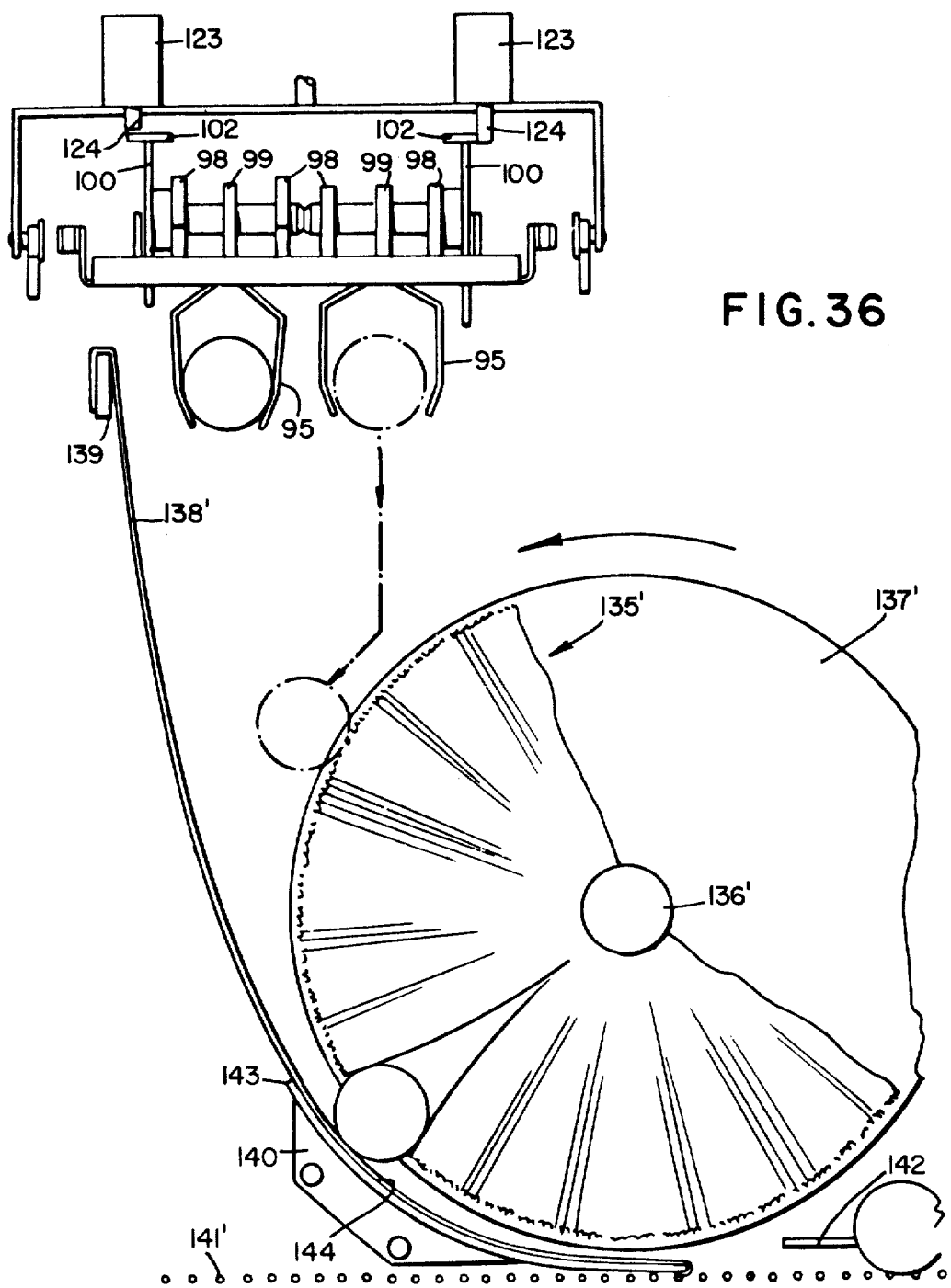
FIG. 36 is a cross-sectional view of the receiving station illustrated in FIG. 34.

FIGS. 34-36 illustrate another embodiment of the handling system of the invention in which frame 121 is disposed over a single rotatable resilient cylinder 135 mounted on drive shaft 136'. A plurality of rotatable disks 137' are also mounted on shaft 136' and define a plurality of channels for receiving eggs from the carriage assemblies 92. The cylinder is disposed below frame 121 and carriage assemblies 92 and has its peripheral end disposed generally contiguous and slightly spaced from a plurality of elongated flexible guide members 138', each of which may comprise a sheet of mylar plastic, fixed at one end to a stationary rail 139 disposed adjacent the egg conveyor and at the other end over the vertical lower end of a stationary, rigid, arcuate-shaped support member 140 disposed beneath the lower end of the cylinder. Conveyor belt 141 is disposed below the cylinder for conveying eggs received thereon to an egg packer (not shown) which packs the eggs into cartons or trays as desired and is divided into a plurality of channels aligned with the disks 137' by means of a plurality of elongated stationary guide members 142 which are upwardly convex in shape and are suspended over the conveyor belt in close proximity thereto. Suitable drive means, such as an electric motor, is coupled to shaft 136' for rotating the cylinder so that the peripheral end thereof rotates downwardly and away from carriage assemblies 92, i.e., in a counter-clockwise direction. As can be readily seen in FIG. 36, guide member 140 has an upper lip 143 disposed below shaft 136' about which cylinder 135' rotates and includes an egg-supporting surface 144' which is disposed beneath and spaced from the peripheral end of the cylinder. This surface is curved in a direction substantially in conformance with that of the cylinder (i.e., parallel thereto) in order to maintain contact between the cylinder and the eggs guided along members 138' and 140 onto conveyor 141. The cylinder may, as previously described, comprise a rotating brush fabricated from nylon bristles. Also other resilient members such as foam, inflatable means or the like may also be utilized.

In operation, eggs are carried by the prongs 95 of carriage assemblies 92 until they reach a receiving station of the egg grader. When the eggs arrive above the appropriate station solenoids 123 are selectively actuated as previously described so that plungers 124 of solenoids 123 engage the upper T-sections 102 of extension bars 100 and cause the bars to rotate in a counter-clockwise direction about shaft 97, thereby releasing the eggs from the carriage assemblies. The eggs then drop downwardly as shown in FIG. 36, and are caught by cylinder 135' and members 138' and 140. More specifically, the eggs are released prior to the receiving station, dependent upon the operating speed of the machine. The cylinder then carries the eggs downwardly and outwardly away from carriage assemblies 92 into the channels of conveyor 141.

It should be noted that although plurality of elongated guide members 138' have been illustrated in the drawings, a single elongated sheet member could also be used in conjunction with cylinder 135' to catch and guide the eggs released from the carriage assemblies toward conveyor 141.

Figure 37:
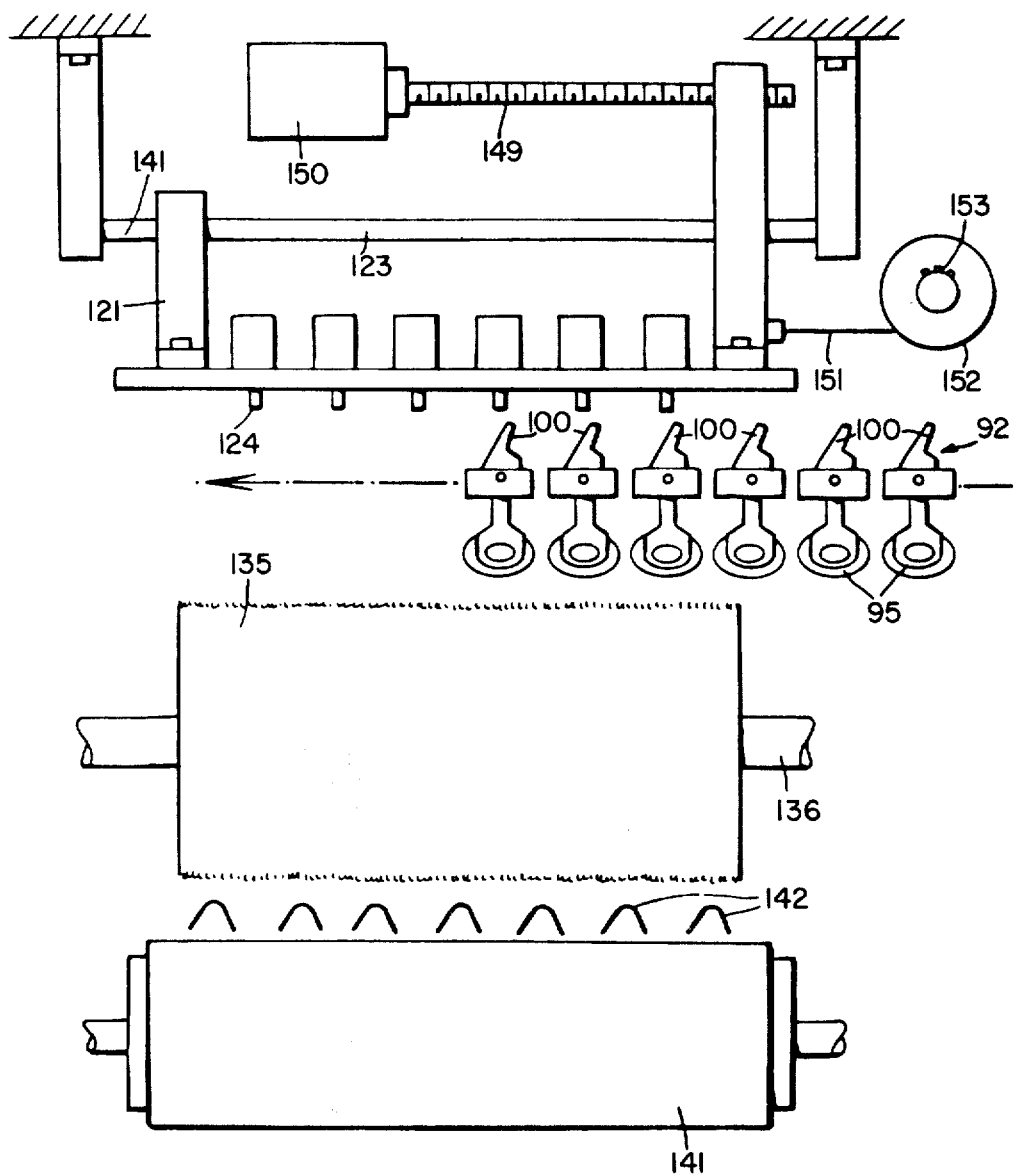
FIG. 37 is a side view of another embodiment of a receiving station of the egg processing system of the present invention.

FIG. 37 illustrates another embodiment of the receiving station in which frame 121 is slidably mounted on cylindrical rods 148 and is coupled to an elongated threaded shaft 149 driven by a reversible motor 150. The position of the frame 121 with respect to the cylinders 135 is adjusted by energizing motor 150 until it is moved to a predetermined position for a particular motor speed at which the conveyor is to operate. The frame is coupled by a cable 151 to a pulley 152 connected to a main drive motor speed control 153 which controls the motor which drives the egg conveyor. Thus, when the position of frame 121 is adjusted to the location corresponding to the particular speed at which the conveyor is to operate, cable 151 will be either wound or unwound on pulley 152 so as to rotate speed control 153 and adjust the speed of the drive motor for the conveyor. As in the embodiment of the inventions previously described, the position of the solenoids carried by frame 121 and, hence, the trajectory of the eggs released by carriage assemblies 92 at the receiving station, are synchronized at all speeds. Speed control 153 may comprise any suitable device for controlling the speed of a motor, such as a potentiometer, shaft encoder or the like. In other respects, the operation of this embodiment of the invention is the same as those previously described.

Figure 38:
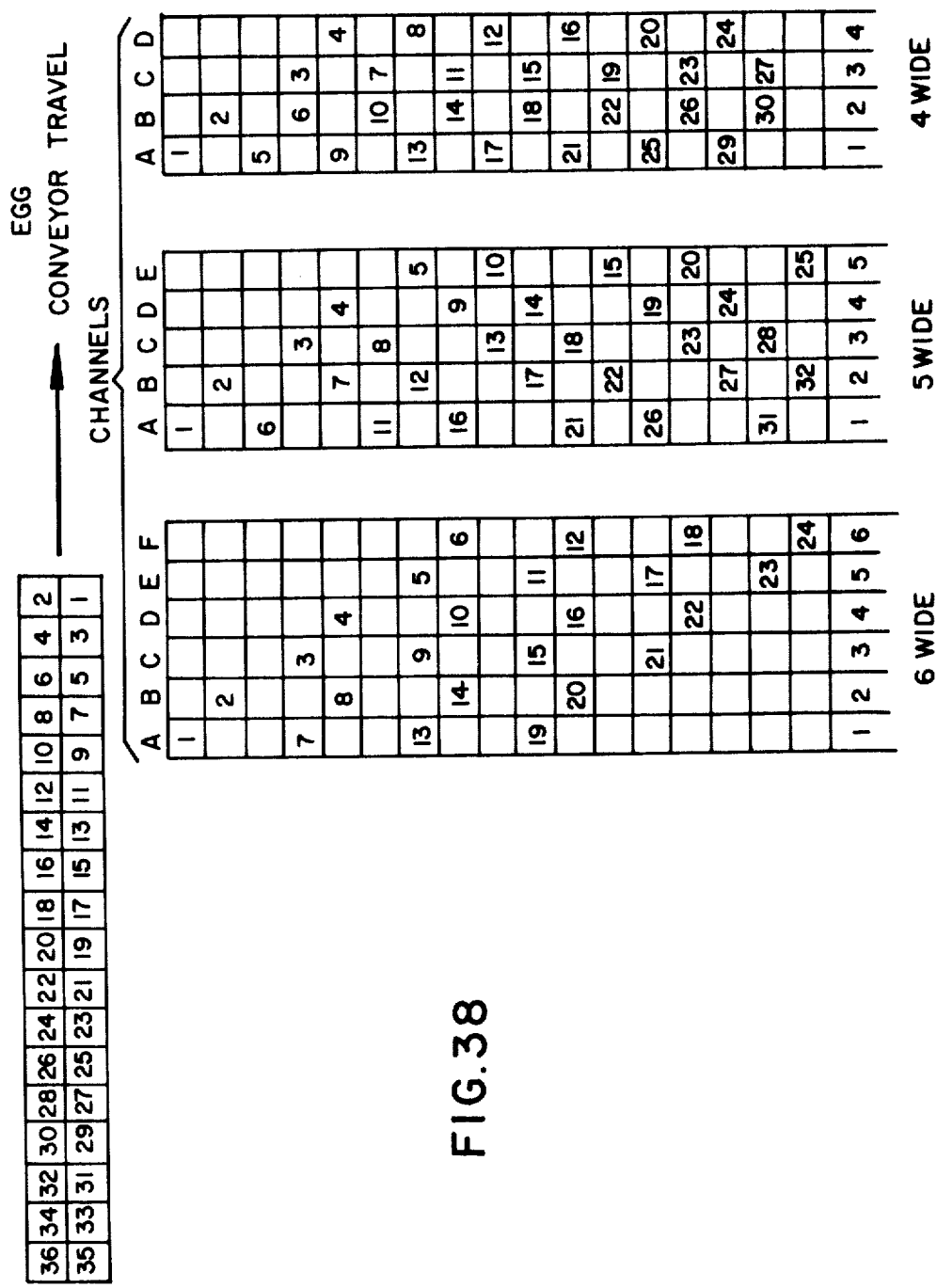
FIG. 38 is a schematic illustration of the sequence in which eggs are dropped into the receiving station from the egg conveyor.

As shown in FIG. 38, release of the eggs from the carriage assemblies is selectively controlled so as to drop the eggs successively into the channels formed by disks 137 and 137' in cylinders 135 and 135' and members 142 on conveyor 141 beginning with the first such channel reached by the eggs as they are conveyed by carriage assemblies 92 to the receiving station. Sequences which may be used for six, five and four channels, respectively, are illustrated in the drawing. By releasing the eggs from the carriage assemblies into the cylinders 135 and 135' as described, i.e., over the entire axial length of the area of the cylinders available for receiving the eggs, an even distribution of the eggs is obtained in the channels of conveyor 141.

Generally speaking, all eggs which have been determined to have identical or similar physical characteristics are preferably dropped in the channels at one receiving station in the sequence illustrated in FIG. 38. For example, egg no. 1 will be dropped in channel A, egg no. 2 in channel B, etc. until all the channels have received an egg, whereupon the process is repeated.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An article coding and separating system for operator coding of selected articles being conveyed past an inspection area along with a larger quantity of articles, which comprises:

conveying means for carrying a plurality of articles through said inspection area;

support means disposed above said inspection area;

an elongated pointer means having its upper end pivotally mounted to said support means for pivotable movement in at least two directions over said conveying means within a selected area of the inspection area, one of said directions being approximately parallel to the longitudinal axis of said conveying means and the other of said directions being perpendicular thereto;

said pointer means having the vertical lower end thereof disposed adjacent the conveying means and being further adapted for axial movement along the longitudinal axis thereof so that the vertical lower end of the pointer means is movable into and out of engagement with selective articles passing within the selected area of the inspection area;

said pointer means further including means coupled thereto responsive to the pivotal movement thereof for generating at least a first signal for identifying the position of selective articles on said conveying means when said articles are engaged by said pointer means; and means for separating said selected articles from the remaining articles in accordance with the coding thereof.

2. The article coding and separating system of claim 1 wherein said pointer means comprises, a first axle means rotatably mounted in said support means in a direction perpendicular to the longitudinal axis of said conveying means, said axle means including a pivotable frame means rigidly mounted on said axle means, and a second axle means rotatably mounted in said pivotal frame means in a direction parallel to the longitudinal axis of said conveying means and being coupled to said pointer means, said first and second axle means permitting said pivotable movement of said pointer means in said directions parallel and perpendicular to said longitudinal axis of said conveying means, respectively, within said selected area of said inspection area.

3. The article coding and separating system of claim 2 wherein said pointer means further comprises a second frame means coupled to said second axle means, and flange means disposed at the vertically upper end of said pointer means, said pointer means extending through said second frame means and including spring means disposed between said flange means and said second frame means so as to permit axial movement of said pointer means toward and away from said conveyor means.

4. The article coding and separating system of claim 3 wherein said pointer means comprises elongated hollow tubular means pivotably mounted at the vertically upper end thereof over said conveying means within said selected area of said inspection area.

5. The article coding and separating system of claim 1 wherein said means for generating said first signal comprises means for generating an electrical signal representing the arc tan of A/H, where H represents the vertical height of the pivot point of said pointer means above the center of said articles disposed on said conveying means, and A represents the horizontal distance along the longitudinal axis of said conveying means between a first position of the vertical lower end of said pointer means when said pointer means is disposed perpendicular to said conveying means, and a second position of the lower end of said pointer means when said pointer means is disposed in engagement with an article on said conveying means, and means for generating another electrical signal representing the arc tan of B/H, where H represents the vertical height of the pivot point of said pointer means above the center of said articles disposed on said conveying means and B represents the horizontal distance in a direction perpendicular to the longitudinal axis of said conveying means between said first position of said lower end of said pointer means and said second position of said lower end of said pointer means.

6. The article coding and separating system of claim 5 wherein said means for generating said first electrical signal comprises potentiometer means coupled to the vertical upper end of said pointer means.

7. The article coding and separating system of claim 6 wherein said potentiometer means comprises first and second potentiometer means coupled to said first and second axle means.

8. The article coding and separating system of claim 7 wherein said first and second potentiometer means are coupled to said first and second axle means by gear means.

9. The article coding and separating system of claim 6 wherein said means for generating said first electrical signal further comprises switch means coupled to the vertical lower end of said pointer means, said switch means being adapted for engagement with the articles conveyed by said conveying means through said selected area of said inspection area.

10. The article coding and separating system of claim 9 wherein said switch means comprises electrical switch means.

11. The article coding and separating system of claim 10 wherein said switch means comprises pneumatic switch means.

12. The article coding and separating system of claim 11 wherein said pneumatic switch means comprises, means for supplying air under pressure to the interior of said pointer means, cylinder means slidably disposed in the vertical lower end of said pointer means, said cylinder means including an elongated portion adapted to extend from said vertical lower end of said pointer means for engaging said selective articles disposed on said conveying means within said selected area of said inspection area, said pointer means including aperture means, disposed at the vertical lower end thereof adjacent said cylinder means, for permitting the flow of air from said interior of said pointer means, said cylinder means being adapted to cover said aperture means when said elongated portion engages said selective articles disposed on said conveying means within said selected area of said inspection area and thereby activate said pneumatic switch means and generate said first electrical signal.

13. The article coding and separating system of claim 12 further comprising means for generating a second signal approximately simultaneously with the generation of said first signal, including at least one manually-operable switch means disposed toward the vertical lower end of said pointer means.

14. The article coding and separting system of claim 13 wherein said manually-operable switch means comprises pneumatic switch means including means for supplying air under pressure to said pneumatic switch means, said pointer means including aperture means coupled to said pneumatic switch means and being disposed in said pointer means towards said vertical lower end of said pointer means and being adapted for manual closure from the exterior of said pointer means.

15. In an egg candler by which defects such as blood spots, dirt stains, rough spots and shell cracks of individual eggs of a mass of eggs being processed are detected, said system including movable spool bar means for conveying eggs through said candler in spaced-apart, aligned relationship, and means for generating high intensity light beneath said spool bar means and said eggs for enabling visual detection of said defects as said eggs are conveyed through said candler by said spool bar means, the improvement comprising, elongated movable pointer means having its upper end pivotally mounted above said spool bar means and adapted for pivotable movement in mutually orthogonal directions within a selected area of said candler over said spool bar means, one of said directions being parallel to the longitudinal axis of said spool bar means and the other of said directions being perpendicular thereto, said pointer means having the vertical lower end thereof disposed adjacent said spool bar means and being further adapted for axial movement along the longitudinal axis thereof so that said vertical lower end of said pointer means is movable into and out of engagement with the shells of eggs disposed within said selected area of said candler, said pointer means further including means for generating at least one first electrical signal for indicating the position of eggs having defects on said spool bar means when the shells of said eggs are engaged by said pointer means, and means for generating at least one second electrical signal, approximately simultaneously with the generation of said first electrical signal, for identifying the type of defect detected in said eggs engaged by said pointer means.

16. The improvement recited in claim 15, wherein said pointer means comprises, first frame means disposed over said spool bar means, first axle means rotatably mounted in said frame means in a direction perpendicular to the longitudinal axis of said spool bar means, said axle means including second pivotable frame means rigidly mounted on said axle means, and second axle means rotatably mounted in said second frame means in a direction parallel to the longitudinal axis of said spool bar means and being coupled to said pointer means, said first and second axle means permitting said pivotable movement of said pointer means in said directions parallel and perpendicular to said longitudinal axis of said spool bar means, respectively, within said selected area of said candler.

17. The improvement recited in claim 16, wherein said pointer means further comprises third frame means coupled to said second axle means, and flange means disposed at the vertically upper end of said pointer means, said pointer means extending through said third frame means and including spring means disposed between said flange means and said third frame means so as to permit said axial movement of said pointer means toward and away from said spool bar means.

18. The improvement recited in claim 17, wherein said pointer means comprises elongated hollow rod means pivotably mounted at the vertically upper end thereof over said spool bar means within said selected area of said candler.

19. In an egg candler for detecting a plurality of defects of defective eggs randomly dispersed in a plurality of eggs continuously conveyed through said candler, said candler including means for conveying said plurality of eggs through said candler in spaced-apart, aligned relationship, and means for enabling visual detection of said defects as said eggs are conveyed through said candler by said conveying means, the improvement comprising, elongated movable rod means mounted vertically above said conveying means and adapted for pivotable movement in at least two directions within a selected area of said candler over said conveying means, one of said directions being approximately parallel to the longitudinal axis of said conveying means and the other of said directions being perpendicular thereto, said rod means having the vertically lower end thereof disposed adjacent said conveying means and being further adapted for axial movement along the longitudinal axis thereof so that said vertically lower end of said rod means is movable into and out of engagement with the shells of eggs disposed within said selected area of said candler on said conveying means, said rod means further including means for generating at least one first signal for identifying the position of eggs having defects on said conveying means when the shells of said eggs are engaged by said rod means, and means for generating at least one second signal, approximately simultaneously with the generation of said first signal, for identifying the type of defect detected in said eggs engaged by said rod means, said means for generating said first electrical signal comprising means for generating an electrical signal representing the arc tan of A/H, where H represents the vertical height of a point at which said pointer is pivotally mounted above the center of said eggs disposed on said spool bar means, and A represents the horizontal distance along the longitudinal axis of said spool bar means between a first position of the vertically lower end of said pointer means when said pointer means is disposed perpendicular to said spool bar means, and a second position of the lower end of said pointer means when said pointer means is disposed in engagement with an egg on said spool bar means, and means for generating another electrical signal representing the arc tan of B/H, where H represents the vertical height of said point at which said pointer means is mounted above the center of said eggs disposed on said spool bar means and B represents the horizontal distance in a direction perpendicular to the longitudinal axis of said spool bar means between said first position of said lower end of said pointer means and said second position of said lower end of said pointer means.

20. The improvement recited in claim 19, wherein said means for generating said first electrical signal comprises potentiometer means coupled to the vertically upper end of said pointer means.

21. The improvement recited in claim 20, wherein said means for generating said first electrical signal further comprises switch means coupled to the vertically lower end of said pointer means, said switch means being adapted for engagement with the shells of eggs conveyed by said spool bar means through said selected area of said candler.

22. The improvement recited in claim 21, wherein said switch means comprises electrical switch means.

23. The improvement recited in claim 21, wherein said switch means comprises pneumatic switch means.

24. The improvement recited in claim 23, wherein said pneumatic switch means comprises, means for supplying air under pressure to the interior of said pointer means, cylinder means slidably disposed in the vertically lower end of said pointer means, said cylinder means including an elongated portion adapted to extend from said vertically lower end of said pointer means for engaging the shells of eggs disposed on said spool bar means within said selected area of said candler, said pointer means including aperture means, disposed at the vertically lower end thereof adjacent said cylinder means, for permitting the flow of air from said interior of said pointer means, said cylinder means being adapted to cover said aperture means when said elongated portion engages the shell of an egg disposed on said spool bar means within said selected area of said candler and thereby activate said pneumatic switch means and generate said first electrical signal.

25. The improvement recited in claim 20, wherein said means for generating said second electrical signal comprises at least one manually-operable switch means disposed towards the vertically lower end of said pointer means.

26. The improvement recited in claim 25, wherein said manually open switch means comprises pneumatic switch means including means for supplying air under pressure to said pneumatic switch means, said pointer means including aperture means coupled to said pneumatic switch means and being disposed in said pointer means towards said vertically lower end of said pointer means and being adapted for manual closure from the exterior of said pointer means.

27. The improvement recited in claim 19, wherein said pointer means comprises, first frame means disposed over said spool bar means, first axle means rotatably mounted in said frame means in a direction perpendicular to the longitudinal axis of said spool bar means, said axle means including second pivotable frame means rigidly mounted on said axle means, and second axle means rotatably mounted in said second frame means in a direction parallel to the longitudinal axis of said spool bar means and being coupled to said pointer means, said first and second axle means permitting said pivotable movement of said pointer means in said directions parallel and perpendicular to said longitudinal axis of said spool bar means, respectively, within said selected area of said candler.

28. The improvement recited in claim 27, wherein said potentiometer means comprises first and second potentiometer means coupled to said first and second axle means.

29. The improvement recited in claim 28, wherein said first and second potentiometer means are coupled to said first and second axle means by gear means.

30. A method of coding and separating selected articles being conveyed past an inspection area along with a larger quantity of articles which comprise the steps of:

conveying the quantity of articles in spaced-apart relationship on a conveyor means through the inspection area;

selecting the article to be coded while being conveyed through the inspection area;

pivotally swinging a pointer means toward the location of the article to be coded;

generating at least one first signal responsive to the angular position of the pointer means with respect to the conveying means;

contacting the article to be coded with the pivotally swinging pointer means thereby identifying the location of the article to be coded; and separating the coded article from the remaining articles.

31. The method recited in claim 30, wherein said step of generating said first signal comprises generating a first signal representing the angular position of said pointer means along the longitudinal axis of said conveyor means and along an axis perpendicular to said longitudinal axis of said conveyor means.

32. The method recited in claim 30 further comprising the step of generating a second signal identifying a physical characteristic of the article to be coded approximately simultaneously with the generating of said first signal, the location and physical characteristic of the article to be coded thereby being identified when said article is contacted by said pointer means.

33. A method of identifying the location of a defective egg in an egg candling apparatus which comprises the steps of:

conveying a plurality of eggs including randomly-dispersed defective eggs on a conveyor means through the egg candling apparatus in spaced-apart, aligned relationship, detecting the presence of defective eggs within the egg candling apparatus;

pivotally swinging a pointer means toward the location of the defective egg;

generating a first signal responsive to the angular position of the pointer means with respect to the conveyor means, and contacting the defective egg with the pivotally swinging pointer means thereby identifying the location of the defective egg.

34. The method recited in claim 33, further comprising the step of generating, approximately simultaneously with said step of generating said first signal, at least one second signal identifying the type of defect in said defective eggs.

35. The method recited in claim 34, wherein said steps of generating said first and second signals comprise generating first and second electrical signals indicating the position of said defective eggs within said candling apparatus and the type of defect in said defective eggs, respectively.

36. The method recited in claim 35, wherein said pointer means is adapted for pivotable movement over said spool bar conveying means, and wherein said step of generating said first electrical signal comprises the step of generating an electrical signal representing the angle formed between a first, vertical position of said pointer means and a second position of said pointer means along the longitudinal axis of said spool bar conveying means when the vertically lower end of said pointer means is disposed in engagement with an egg on said spool bar conveying means, and another electrical signal representing the angle formed between said first, vertical position of said pointer means and said second position of said pointer means transversely along an axis perpendicular to the longitudinal axis of said spool bar conveying means when the vertically lower end of said pointer means is disposed in engagement with said egg on said spool bar conveying means.

* * * * *